United States Patent
Kikuchi et al.

(10) Patent No.: US 7,356,557 B2
(45) Date of Patent: Apr. 8, 2008

(54) CONTENT DISTRIBUTION SYSTEM; CONTENT DISTRIBUTION METHOD; DISTRIBUTION SERVER, CLIENT TERMINAL, AND PORTABLE TERMINAL USED IN THE SYSTEM; AND COMPUTER READABLE RECORDING MEDIUM ON WHICH IS RECORDED A PROGRAM FOR OPERATING A COMPUTER USED IN THE SYSTEM

(75) Inventors: Takeshi Kikuchi, Shizuoka-ken (JP); Yutaka Hasegawa, Shizuoka-ken (JP); Kosei Terada, Shizuoka-ken (JP); Satoru Umezawa, Shizuoka-ken (JP)

(73) Assignee: Yamaha Corporation, Hamamatsu-shi (JP)

( * ) Notice: Subject to any disclaimer, the term of this patent is extended or adjusted under 35 U.S.C. 154(b) by 660 days.

(21) Appl. No.: 09/882,721

(22) Filed: Jun. 15, 2001

(65) Prior Publication Data
US 2002/0010740 A1    Jan. 24, 2002

(30) Foreign Application Priority Data
Jun. 16, 2000  (JP) ............................. 2000-181648
Nov. 30, 2000  (JP) ............................. 2000-366160

(51) Int. Cl.
G06F 15/16    (2006.01)

(52) U.S. Cl. ...................... 709/201; 709/203; 709/217; 709/219; 709/226; 709/232; 705/26; 705/52

(58) Field of Classification Search ................ 709/203, 709/206, 217, 201, 219, 226, 227, 232; 705/26, 705/52; 379/375.01, 418
See application file for complete search history.

(56) References Cited

U.S. PATENT DOCUMENTS

| 5,926,624 | A  | * | 7/1999  | Katz et al. ................... 709/217 |
| 6,230,189 | B1 |   | 5/2001  | Sato et al. |
| 6,370,389 | B1 | * | 4/2002  | Isomursu et al. ........... 455/466 |
| 6,441,291 | B2 | * | 8/2002  | Hasegawa et al. ............ 84/609 |
| 6,633,849 | B1 | * | 10/2003 | Dodd ............................ 705/1 |

(Continued)

FOREIGN PATENT DOCUMENTS

EP    0 933 901 A1    8/1999

(Continued)

OTHER PUBLICATIONS

Yohei Ouchi, "Let's Make a Greeting Card of New Generation: Greeting by Computer", PCfan Vo. 4, No. 21, Kabushiki Kaisha Mainichi Communications.

*Primary Examiner*—Phuoc Nguyen
(74) *Attorney, Agent, or Firm*—Morrison & Foerster LLP

(57) ABSTRACT

A user accesses a sound data distribution server by operating a client terminal. The sound data distribution server transmits data for displaying a list of distributable music. The data are displayed on a display unit of the client terminal. While referring to the display on the display unit, the user requests the sound data distribution server for distribution of regular music data. This request is issued from the client terminal. A cellular phone to which the regular music data are to be distributed is specified by data (e.g., a mail address of the cellular phone) input at the client terminal. This enables the sound data distribution server to recognize the cellular phone and distribute the regular music data to the cellular phone.

30 Claims, 21 Drawing Sheets

U.S. PATENT DOCUMENTS

| | | | |
|---|---|---|---|
| 6,672,775 B1 * | 1/2004 | Narayanaswami | 709/219 |
| 6,732,152 B2 * | 5/2004 | Lockhart et al. | 709/206 |
| 6,779,178 B1 * | 8/2004 | Lloyd et al. | 709/206 |
| 6,941,270 B1 * | 9/2005 | Hannula | 705/1 |
| 7,113,927 B1 * | 9/2006 | Tanaka et al. | 705/56 |

FOREIGN PATENT DOCUMENTS

| | | |
|---|---|---|
| JP | 10-224839 | 8/1998 |
| JP | 11-127262 | 5/1999 |
| JP | 11-177614 | 7/1999 |
| JP | 11-225155 | 8/1999 |
| JP | 11-242490 | 9/1999 |
| JP | 11-345261 | 12/1999 |
| JP | 11-345271 | 12/1999 |
| JP | 2000-047679 | 2/2000 |
| JP | 2000-134332 | 5/2000 |
| WO | WO 99/09718 | 2/1999 |

* cited by examiner

FIG. 11

| NUMBER | MUSIC ID | TRIAL LISTEN | GENRE | TITLE | ARTIST | COMPOSER | LYRICIST | INTRO | MAIL |
|---|---|---|---|---|---|---|---|---|---|
| 1 | 1234 | △ | JAPANESE POPS | AAAA | aaaa | bbbb | cccc | SPRING····· | TRANSMISSION |
| 2 | 2345 | △ | JAPANESE POPS | DDDD | dddd | eeee | ffff | ··SPRING····· | TRANSMISSION |
| 3 | 0012 | △ | JAPANESE POPS | GGGG | gggg | hhhh | iiii | SPRING····· | TRANSMISSION |
| ·· | ·· | △ | ·· | ·· | ·· | ·· | ·· | ·· | TRANSMISSION |

FIG. 21

| NUMBER | REGISTRATION DATE | MUSIC ID | PURCHASE | GENRE | TITLE | ARTIST | COMPOSER | LYRICIST | INTRO |
|---|---|---|---|---|---|---|---|---|---|
| 1 | 2000/11/01 | 1234 | △ | JAPANESE POPS | AAAA | aaaa | bbbb | cccc | SPRING····· |
| 2 | 2000/10/30 | 2345 | △ | JAPANESE POPS | DDDD | dddd | eeee | ffff | ··SUMMER··· |
| 3 | 2000/10/25 | 0012 | △ | JAPANESE POPS | GGGG | gggg | hhhh | iiii | AUTUMN···· |
| ··· | ····· | ··· | ····· | ··· | ·· | ·· | ·· | ·· | ·· |
| 9 | 2000/9/9 | 3515 | △ | JAPANESE POPS | KKKK | kkkk | nnnn | oooo | SPRING····· |
| 10 | 2000/9/8 | 0524 | △ | JAPANESE POPS | LLLL | llll | mmmm | qqqq | WINTER····· |

SEARCH RESULTS (SELECT MUSIC)

DISPLAY NEXT 10

CONTENT DISTRIBUTION SYSTEM; CONTENT DISTRIBUTION METHOD; DISTRIBUTION SERVER, CLIENT TERMINAL, AND PORTABLE TERMINAL USED IN THE SYSTEM; AND COMPUTER READABLE RECORDING MEDIUM ON WHICH IS RECORDED A PROGRAM FOR OPERATING A COMPUTER USED IN THE SYSTEM

BACKGROUND OF THE INVENTION

1. Field of the Invention

The present invention relates to a system which includes a distribution server capable of distributing content items such as sound data (e.g., data of incoming call melodies), a client terminal (e.g., a personal computer) capable of communicating with the distribution server, and a portable terminal (e.g., a cellular phone) capable of communicating with the distribution server, and in which the distribution server distributes the content items to the client terminal or the portable terminal.

2. Description of the Related Art

With recent development of communication techniques, portable terminals such as cellular phones and mobile computers have come into wide use. Meanwhile, the number of content distribution services which enable users to obtain content items to be used on their portable terminals has increased. Among the content distribution services, a service which enables a cellular phone, which is one type of portable terminal, to obtain data of an incoming call melody, which is one type of content item, is called an "incoming-call-melody providing service." The incoming-call-melody providing service enables a user of a cellular phone to select a desired music data item from a large number of music data items provided in the distribution server and to request distribution of the selected music data item. In response to the request, the distribution server distributes to the cellular phone the music data item selected by the user.

However, under the above-described conventional technique, all of various operations for obtaining an incoming call melody must be performed on a cellular phone. However, such operations are not easy to perform on cellular phones having a reduced size. Therefore, completing necessary operations requires a prolonged period of time. In addition, in the case in which a user decides whether to buy a music data item after a trial listen of the music (trial of a content item), the time during which his/her cellular phone is connected to a distribution server tends to increase. Moreover, due to relatively high communication cost of such a cellular phone, among other causes, a relatively high usage fee is charged to a user.

SUMMARY OF THE INVENTION

In view of the foregoing, an object of the present invention is to provide a content distribution system and method which enable users to obtain content items for portable terminals from a distribution server through simple operation, without imposing undue stress on the users.

Another object of the present invention is to provide a distribution server, a client terminal, and a portable terminal which constitute the content distribution system.

Still another object of the present invention is to provide a computer readable recording medium on which is recorded a program for operating a computer used in the content distribution system.

In order to achieve the above objects, the present invention provides a content distribution system which comprises a portable terminal, a distribution server capable of communicating with the portable terminal, and a client terminal capable of communicating with the distribution server and in which a content item is distributed from the distribution server to the portable terminal, wherein the distribution server comprises content distribution means for distributing the content item to the portable terminal in response to a request from the client terminal; the client terminal comprises content request means for requesting the distribution server to distribute the content item to the portable terminal; and the portable terminal comprises content execution means for performing operation on the basis of the distributed content item.

By virtue of the above-described configuration, a user can request the distribution server to distribute the content item to the portable terminal, by operating the client terminal, which is generally superior in ease of operation to the portable terminal. Therefore, the user can easily receive the content distribution service.

In the content distribution system, preferably, the distribution server comprises trial-content distribution means for distributing, in response to a request from the client terminal, a trial content item to the client terminal, the trial content item being used at the client terminal in trial use of the content item to be distributed to the portable terminal; and the client terminal comprises trial-content request means for requesting the distribution server to distribute the trial content item, and trial means for using on a trial basis the trial content item transmitted from the distribution server.

By virtue of the above-described configuration, through operation of the client terminal a user can easily obtain the trial content item which is used at the client terminal in a trial use of the content item to be distributed to the portable terminal.

Preferably, the content distribution means of the distribution server comprises URL mailing means for sending an electronic mail to the portable terminal in order to transmit to the portable terminal the URL of a download page for downloading the content item, and download means for downloading the content item to the portable terminal in response to access to the URL by the portable terminal; and the portable terminal comprises content obtaining means for accessing the URL of the download page transmitted from the distribution server in order to download the content item.

By virtue of the above-described configuration, a user can obtain the content item through simple operation of accessing a URL which is transmitted by use of an electronic mail function provided in many portable terminals. Therefore, the user can easily receive distribution of the content item. In addition, since the user must access the transmitted URL in order to obtain the content item, a final confirmation as to whether the user wishes to purchase the content item can be performed at the portable terminal.

Preferably, the content request means of the client terminal comprises address transmission means for transmitting to the distribution server a mail address of the portable terminal to which the URL of the download page is to be transmitted by means of an electronic mail.

By virtue of the above-described configuration, a user can easily transmit to the distribution server the mail address of the portable terminal to which the content item is to be downloaded.

Preferably, the content request means of the client terminal comprises portable-terminal-specifying-data transmission means for transmitting to the distribution server data for specifying the portable terminal; and the content distribution means of the distribution server comprises direct distribution means for distributing the content item directly to the portable terminal specified by the data transmitted by the portable-terminal-specifying-data transmission means.

By virtue of the above-described configuration, a user can easily cause the distribution server to recognize the portable terminal to which the content item is to be distributed, by use of the client terminal, and enable the portable terminal to obtain the content item.

Preferably, the data transmitted by the portable-terminal-specifying-data transmission means of the client terminal include a mail address of the portable terminal; and the direct distribution means of the distribution server transmits an electronic mail directed to the mail address of the portable terminal, while attaching the content item to the electronic mail.

By virtue of the above-described configuration, by use of the client terminal a user can easily transmit to the distribution server the mail address of the portable terminal to which the content item is to be distributed. In addition, the user can easily obtain the content item by use of an electronic mail function and a document attaching function thereof provided in many portable terminals.

Preferably, the client terminal comprises type-specifying-data transmission means for transmitting to the distribution server data which specify a type of the content execution means of the portable terminal; and the content distribution means of the distribution server distributes to the portable terminal a content item corresponding to the data which specify the type of the content execution means of the portable terminal.

The above-described configuration enables distribution of content items suitable for (usable in) various cellular phones (i.e., portable terminals which perform operation on the basis of the content items) which differ from one another in terms of configuration of a sound source circuit (i.e., content execution means) for reproducing, for example, an incoming call melody.

Preferably, in the system configured to distribute to the portable terminal a content item corresponding to the data which specify the type of the content execution means of the portable terminal, the distribution server comprises a database which stores a content item; and the content distribution means processes the content item stored in the database in accordance with the data which specify the type of the content execution means of the portable terminal and distributes the processed content item to the portable terminal as the requested content item.

The above-described configuration eliminates the necessity of storing a content item in the database of the distribution server for each type of the content execution means of the portable terminal, whereby the capacity of the database can be reduced. In other words, a larger number of content items can be stored in the database in the event its capacity is maintained constant.

Preferably, in the system configured to distribute to the portable terminal a content item corresponding to the data which specify the type of the content execution means of the portable terminal, the distribution server comprises a database which stores a plurality of content items corresponding to types of the content execution means of the portable terminal; and the content distribution means of the distribution server selects one content item from the plurality of content items stored in the database in accordance with the data which specify the type of the content execution means of the portable terminal and distributes the selected content item to the portable terminal.

In this case, since content items are not required to be processed at the distribution server, a content item suitable for (the content execution means of) each portable terminal can be distributed to the portable terminal within a shorter period of time.

The present invention provides another content distribution system which comprises a portable terminal, a client terminal capable of communicating with the portable terminal, and a distribution server capable of communicating with the client terminal and in which a content item is distributed from the distribution server to the portable terminal by use of the client terminal, wherein the distribution server comprises content distribution means for distributing the content item to the client terminal in response to a request from the client terminal; the client terminal comprises content request means for requesting the distribution server to distribute the content item, and content transmission means for transmitting to the portable terminal the content item distributed from the distribution server; and the portable terminal comprises content execution means for performing operation on the basis of the content item transmitted from the client terminal.

In the above-described configuration, in response to a request from the client terminal, the content item is distributed from the distribution server to the client terminal, and the content item distributed to the client terminal is transmitted to the portable terminal. Therefore, a user can easily receive the content distribution service through operation of the client terminal, which is generally superior in ease of operation to the portable terminal.

In the content distribution system, preferably, the distribution server comprises trial-content distribution means for distributing, in response to a request from the client terminal, a trial content item to the client terminal, the trial content item being used at the client terminal in trial use of the content item to be distributed from the client terminal to the portable terminal; and the client terminal comprises trial-content request means for requesting the distribution server to distribute the trial content item, and trial means for using the distributed trial content item on a trial basis.

By virtue of the above-described configuration, through operation of the client terminal a user can easily obtain the trial content item which is used at the client terminal in trial use of the content item to be distributed to the portable terminal.

The present invention provides still another content distribution system which comprises a portable terminal, a distribution server capable of communicating with the portable terminal, and a client terminal capable of communicating with the distribution server and in which a content item is distributed from the distribution server to the portable terminal by use of the client terminal. The distribution server comprises a database which stores a plurality of content items; search means for performing search under search conditions provided from the client terminal in order to select from the stored content items a content item or items which match the search conditions and for transmitting content-specifying data which specify the selected content item or items to the client terminal as search results; and content distribution means for distributing to the portable terminal a content item corresponding to content-specifying data transmitted from the client terminal or the portable terminal. The client terminal comprises search condition transmission means for transmitting the search conditions to the distribution server; and display means for displaying the search results transmitted from the distribution server. The portable terminal comprises content execution means for performing operation on the basis of the distributed content item. The client terminal or the portable terminal comprises content-specifying-data transmission means for transmitting the content-specifying data to the distribution server.

In order to search a content item that a user wishes to be distributed, the user transmits search conditions, such as artist and desired genre, from the client terminal to the distribution server. The distribution server selects from the content items stored in the database a content item or items matching the search conditions and transmits data specific to the selected content item or items (content-specifying data) to the client terminal as search results. The client terminal displays the content-specifying data as search results by use of the display means. From the content-specifying data displayed by the display means, the user selects a content-specifying data item corresponding to the content item desired to be distributed and transmits the selected content-specifying data item from the client terminal or the portable terminal to the distribution server, to thereby request distribution of a content item corresponding to the content-specifying data item. In response to the request, the distribution server transmits to the portable terminal the content item corresponding to the content-specifying data item.

Accordingly, the user can easily perform content search and can receive a desired content, through operation of the client terminal, which is generally superior in ease of operation to the portable terminal.

In the content distribution system, preferably, the distribution server comprises trial-content distribution means for distributing, in response to a request from the client terminal, a trial content item to the client terminal, the trial content item corresponding to the content-specifying data transmitted from the content-specifying-data transmission means and being used at the client terminal in trial use of the content item to be distributed to the portable terminal; and the client terminal comprises trial-content request means for transmitting the content-specifying data to the distribution server and requesting distribution of the trial content item, and trial means for using on a trial basis the trial content item transmitted from the distribution server.

By virtue of the above-described configuration, through operation of the client terminal a user can easily obtain and use the trial content item which is used at the client terminal in trial use of the searched content item.

Preferably, the client terminal or the portable terminal comprises type-specifying-data transmission means for transmitting to the distribution server data which specify a type of the content execution means of the portable terminal; and the content distribution means of the distribution server distributes to the portable terminal a content item corresponding to the content-specifying data transmitted from the content-specifying-data transmission means and the data which specify the type of the content execution means of the portable terminal.

The above-described configuration is suitable for the case in which a content item which the user has selected on the basis of search results is distributed to a cellular phone which the user has selected from various cellular phones (i.e., portable terminals which perform operation on the basis of the content items) which differ from one another in terms of configuration of a sound source circuit (i.e., content execution means) for reproducing, for example, an incoming call melody. In such a case, a content item which satisfies the search conditions and is suitable for the selected cellular phone is distributed to the selected cellular phone.

Preferably, the content distribution means of the distribution server processes a content item stored in the database and corresponding to the content-specifying data in accordance with the data which specify the type of the content execution means of the portable terminal and transmits the processed content item to the portable terminal.

The above-described configuration enables distribution of content items suitable for (usable in) various portable terminals which differ from one another in terms of configuration of the content execution means which performs operation on the basis of the content items. In addition, since content items are not required to be stored in the database of the distribution server for each type of the content execution means of the portable terminal, the capacity of the database can be reduced. Further, a larger number of content items can be stored in the database in the event its capacity is maintained constant.

Preferably, the distribution server comprises a database which stores a plurality of content items corresponding to types of the content execution means of the portable terminal; and the content distribution means of the server selects from the plurality of content items stored in the database one content item corresponding to the content-specifying data, in accordance with the data which specify a type of the content execution means of the portable terminal, and distributes the selected content item to the portable terminal.

The above-described configuration enables distribution of content items suitable for (usable in) various portable terminals which differ from one another in terms of configuration of the content execution means which performs operation on the basis of the content items. In addition, since content items are not required to be processed at the distribution server, a content item suitable for (the content execution means of) each portable terminal can be distributed to the portable terminal within a shorter period of time.

Preferably, in the above-described content distribution system which performs distribution of trial content items, a different trial content item is distributed in accordance with the type of the content execution means of the portable terminal.

The above configuration enables performance of a trial at the client terminal so as to simulate the execution of a content item at the portable terminal. In this case, preferably, the client terminal comprises type-specifying-data transmission means for transmitting to the distribution server data which specify a type of the content execution means of the portable terminal; and the trial content distribution means of the distribution server distributes to the client terminal a trial content item corresponding to the data which specify the type of the content execution means of the portable terminal.

Preferably, in the above-described content distribution system which performs distribution of trial content items, the distribution server charges a predetermined fee to a user of the client terminal when the content item is distributed, and charges a fee lower than the predetermined fee to the user of the client terminal when the trial content item is distributed.

Since the above-described configuration enables the user to try a content item at a lower fee, a content distribution service which satisfies the user can be provided. Notably, the fee lower than the predetermined fee charged upon distribution of the trial content item may be no fee (i.e., the trial content item is provided free of charge).

The present invention provides still another content distribution system which comprises a portable terminal, a distribution server capable of communicating with the portable terminal, and a client terminal capable of communicating with the distribution server and in which a content item is distributed from the distribution server to the portable terminal by use of the client terminal. The distribution server comprises a database for storing a plurality of content items; content storage means for storing the content items in the database together with registration dates each indicating a date on which the corresponding content item has been stored in the database, in such a manner that the registration dates are related to the content items; search means for performing search under search conditions provided from the client terminal in order to select from the content items stored in the database content items which match the search conditions, sorting data representing the selected content items in descending order of registration dates to thereby produce a list, and transmitting the thus-produced list to the client terminal as search results; and content distribution means for distributing to the portable terminal a content item corresponding to content-representing-data transmitted from the client terminal or the portable terminal. The client terminal comprises search condition transmission means for transmitting the search conditions to the distribution server; and display means for displaying the search results transmitted from the distribution server. The portable terminal comprises content execution means for performing operation on the basis of the content item distribution from the distribution server; and the client terminal or the portable terminal comprises data transmission means for transmitting the content-representing data to the distribution server.

In the above-described content distribution system, content items are stored (registered) in the database together with their registration dates. Content items matching the search conditions provided from the client terminal are selected from the database. Subsequently, data representing the selected content items are sorted in descending order of registration dates to thereby produce a list. The thus-produced list is transmitted to the client terminal as search results, which are then displayed on the display means of the client terminal. While referring to the display, the user selects a content item to be distributed, and transmits content-representing data representing the determined content item, from the client terminal or the portable terminal to the distribution server, to thereby obtain the content item at the portable terminal. Accordingly, the user can obtain very easily the latest desired content item which matches the search conditions.

The present invention provides still another content distribution system which comprises a portable terminal, a distribution server capable of communicating with the portable terminal, and a client terminal capable of communicating with the distribution server and in which a content item is distributed from the distribution server to the portable terminal. The distribution server comprises a database for storing a plurality of regular content items and trial content items corresponding to the regular content items; content storage means for storing the regular content items and trial content items in the database together with trial-content registration dates each indicating a date on which the corresponding trial content item has been stored in the database; search means for performing search under search conditions provided from the client terminal in order to select from the regular content items stored in the database regular content items which match the search conditions, sorting data representing the selected regular content items in descending order of registration dates of the trial content items corresponding to the selected regular content items, to thereby produce a list, and transmitting the thus-produced list to the client terminal as search results; trial content distribution means for distributing a trial content item to the client terminal in response to a trial-content distribution request from the client terminal, the trial content item corresponding to content-representing data transmitted from the client terminal together with the distribution request; and regular content distribution means for distributing a regular content item to the portable terminal in response to a regular-content distribution request from the client terminal or the portable terminal, the regular content item corresponding to content-representing data transmitted from the client terminal or the portable terminal together with the distribution request. The client terminal comprises search condition transmission means for transmitting the search conditions to the distribution server; display means for displaying the search results transmitted from the distribution server; and trial-content request means for transmitting the content-representing data and the trial-content distribution request; and trial means for using on a trial basis the trial content item transmitting from the distribution server. The portable terminal comprises content execution means for performing operation on the basis of the regular content item distributed from the distribution server. The client terminal or the portable terminal comprises regular-content request means for transmitting to the distribution server the content-representing data and the regular-content distribution request.

In the above-described content distribution system, in addition to regular content items, trial content items are stored (registered) in the database together with their registration dates. Regular content items matching the search conditions are selected from the database. Subsequently, data representing the selected regular content items are sorted in descending order of registration dates of the trial content times to thereby produce a list. The thus-produced list is transmitted to the client terminal as search results, which are then displayed on the display means of the client terminal. While referring to the display, the user determines a trial content item to be distributed, and transmits content-representing data representing the determined trial content item from the client terminal to the distribution server, to thereby obtain the content item at the client terminal. Accordingly, the user can obtain very easily the latest desired trial content item which matches the search conditions.

Further, in the list displayed as search results, data representing trial content items are displayed in descending order of registration dates of the trial content items. Therefore, even in the case in which trial content items are stored (registered) in the database with a delay after storage of corresponding regular content items, the system treats the registration dates of the trial content items, not the registration dates of the regular content items, as the actual registration dates. Therefore, it is possible to avoid the problem of days passing while regular content items that have been supplied to the distribution server cannot be used on a trial basis, because of a delay in registering trial content items, resulting in the regular content items becoming old by the time the trial content items are registered.

In this case, preferably, the distribution server comprises content conversion means for converting the regular trial content items to the trial content items.

When the above configuration is employed, the trial content items are automatically produced from the regular trail content items in the distribution server, whereby the burden imposed on a content producer is mitigated. Further, even when the content producer does not provide trial content items corresponding to regular trial content items, a service for enabling users to try the regular trial content items can be provided.

In this case, preferably, the client terminal or the portable terminal comprises type-specifying-data transmission means for transmitting to the distribution server data which specify a type of the content execution means of the portable terminal; and the regular content distribution means of the distribution server distributes to the portable terminal the regular content item corresponding to the content-representing data and the data which specify the type of the content execution means of the portable terminal.

The present invention provides still another content distribution system which comprises a client terminal, and a distribution server capable of communicating with the client terminal and in which a content item is distributed from the distribution server to the client terminal. The distribution server comprises a database for storing a content item; content processing means for processing the content item stored in the database in accordance with data transmitted from the client terminal and representing an environment of content execution means of the client terminal; and content distribution means for distributing the processed content item to the client terminal in response to a distribution request from the client terminal. The client terminal comprises content execution means for executing the content item transmitted from the distribution server; distribution request means for requesting the distribution server for distribution of the content item; and environment data transmission means for transmitting to the distribution server the data representing the environment of the content execution means of the client terminal.

For example, if data stored in the distribution server are distributed to the client terminal (including a portable terminal) as they are, upon execution of the data, there is produced a result different from the intended result (for example, tone color differs from the intended tone color). By contrast, when the above-described configuration is employed, the content item stored in the database is processed in accordance with the data representing the environment of the content execution means of the client terminal (e.g., a sound source scheme, a sound source circuit, or a compression scheme used for compressing the data to be used); and the thus-processed content item is distributed to the client terminal. Accordingly, the content item is executed more properly by the content execution means of the client terminal.

The present invention provides still another content distribution system which comprises a first terminal, a distribution server capable of communicating with the first terminal, and a second terminal capable of communicating with the distribution server and in which a content item is distributed from the distribution server to the second terminal. The distribution server comprises a database for storing a content item; content processing means for processing the content item stored in the database in accordance with data transmitted from the first terminal and representing an environment of content execution means of the second terminal; and content distribution means for distributing the processed content item to the second terminal in response to a distribution request from the first or second terminal. The first terminal comprises environment data transmission means for transmitting to the distribution server the data representing the environment of the content execution means of the second terminal. The second terminal comprises content execution means for executing the content transmitted from aid distribution server. The first or second terminal comprises distribution request means for requesting to the distribution server for distribution of the content.

The above-described configuration uses the first and second terminals. Data representing the environment of the content execution means of the second terminal are transmitted from the first terminal to the distribution server, which then transmits to the second terminal a content item corresponding to the data representing the environment. In this case, the distribution server may distribute to the second terminal the content item stored in the database, after processing/conversion of the content item or without processing/conversion. Thus, while using the first terminal, the user can instruct the distribution server to distribute to the second terminal the content item adapted to the content execution means of the second terminal.

Although the content distribution systems according to the present invention have been described above, the present invention encompasses the distribution server, the client terminal (first terminal), and the portable terminal (second terminal), which constitute the content distribution systems; a content distribution method therefor; and a computer readable recording media on which is recorded a program for the content distribution processing.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 11 is an illustration showing a search result display screen which is displayed on the display unit of the client terminal in the sixth embodiment of the present invention;

FIG. 21 is an illustration showing a search result display screen which is displayed on the display unit of the client terminal in the ninth embodiment of the present invention.

DESCRIPTION OF THE PREFERRED EMBODIMENTS

Embodiments of the present invention will be described with reference to the drawings.

First Embodiment

Figure 1:
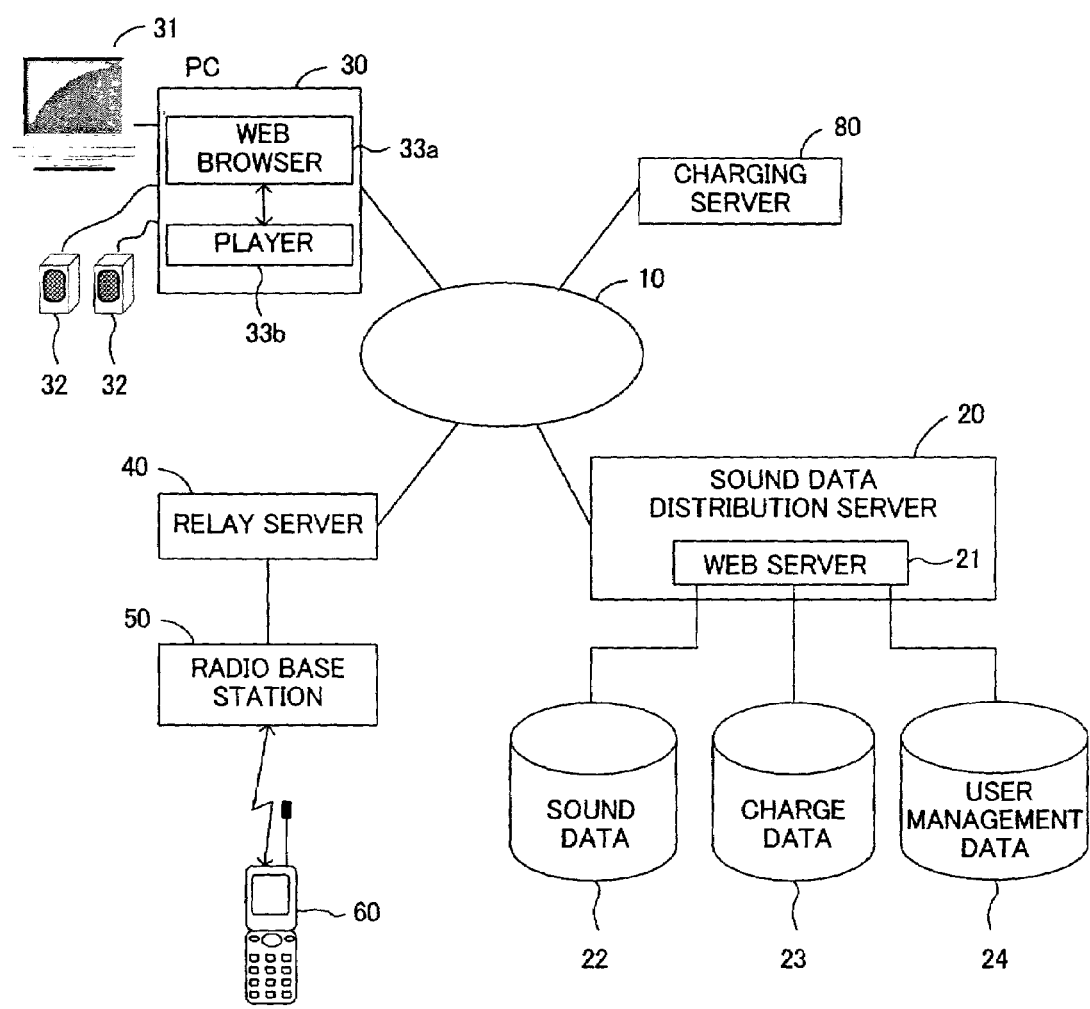
FIG. 1 is a schematic diagram of a content (sound data) distribution system according to the present invention.

FIG. 1 is a schematic system diagram of a content distribution system according to a first embodiment of the present invention. In the present embodiment, content items to be distributed are incoming call melody data (sound data, music data) for cellular phones. The term "incoming call melody" refers to a sound (music) which a cellular phone 60 produces as a ringing tone upon receipt of a call.

The system of the first embodiment utilizes the Internet 10. A sound data distribution server 20 serving as a content distribution server, a client terminal (may be referred to as a "first terminal") 30, a relay server 40, and a charging server 80 are connected to the Internet 10, so that they can communicate (exchange data) with one another. A radio base station 50 is connected to the relay server 40. The cellular phone 60 serving as a portable terminal (may be referred to as a "second terminal") can communicate with the sound data distribution server 20 and the client terminal 30 via the radio base station 50, the relay server 40, and the Internet 10. The cellular phone 60 and the client terminal 30 may be designed to perform direct communication therebetween, without use of the Internet 10, by means of a cable or radio (e.g., radio waves or infrared rays).

The sound data distribution server 20 contains a computer as a structural component. In accordance with a request from the client terminal 30, the sound data distribution server 20 distributes to the client terminal 30 or the cellular phone 60 sound data for trial listening (trial content) or regular sound data (content). The sound data distribution server 20 includes a WEB server 21, a sound-data database 22, a charge database 23, and a user management database 24. A large number of sound data items (in the present embodiment, a large number of regular music data items to be used as incoming call melodies and a large number of trial music data items corresponding to the regular music data items) are stored in the sound-data database 22. Information used for charging usage fee to the user of the cellular phone 60 is stored in the charge database 23. Data regarding the user of the cellular phone 60, such as a phone number of the cellular phone, a password, and a user name, are stored in the user management database 24. Each of the sound data items stored in the sound-data database 22 is related to a type of the cellular phone 60 which can use the sound data; genre; artist; composer; lyricist; introductory phrase; keywords (Christmas, summer, morning, love, etc.); era; and relevant information such as information indicating whether the sound data are a reproduction of an advertising jingle or a theme song of a drama. These data are stored in the sound-data database 22 together with the corresponding sound data and are used for searching, which will be described later. The above-mentioned regular music data which the sound data distribution server 20 distributes may be referred to as "regular content" or simply "content." The above-mentioned music data for trial listening may be referred to as "trial content" to be distinguished form the regular content.

In actuality, the WEB server 21 is a program stored within a computer. the WEB server 21 retrieves necessary data from the databases 22 to 24 and supplies the data to the client terminal 30, the relay server 40, and the charging server 80 in accordance with a predetermined communication protocol (e.g., HTTP). Further, when data are supplied from the client terminal 30, the relay server 40, and the charging server 80 in accordance with the predetermined communication protocol, the WEB server 21 receives and processes the data, and stores the processed data in the databases 22 to 24 if necessary.

Figure 2:
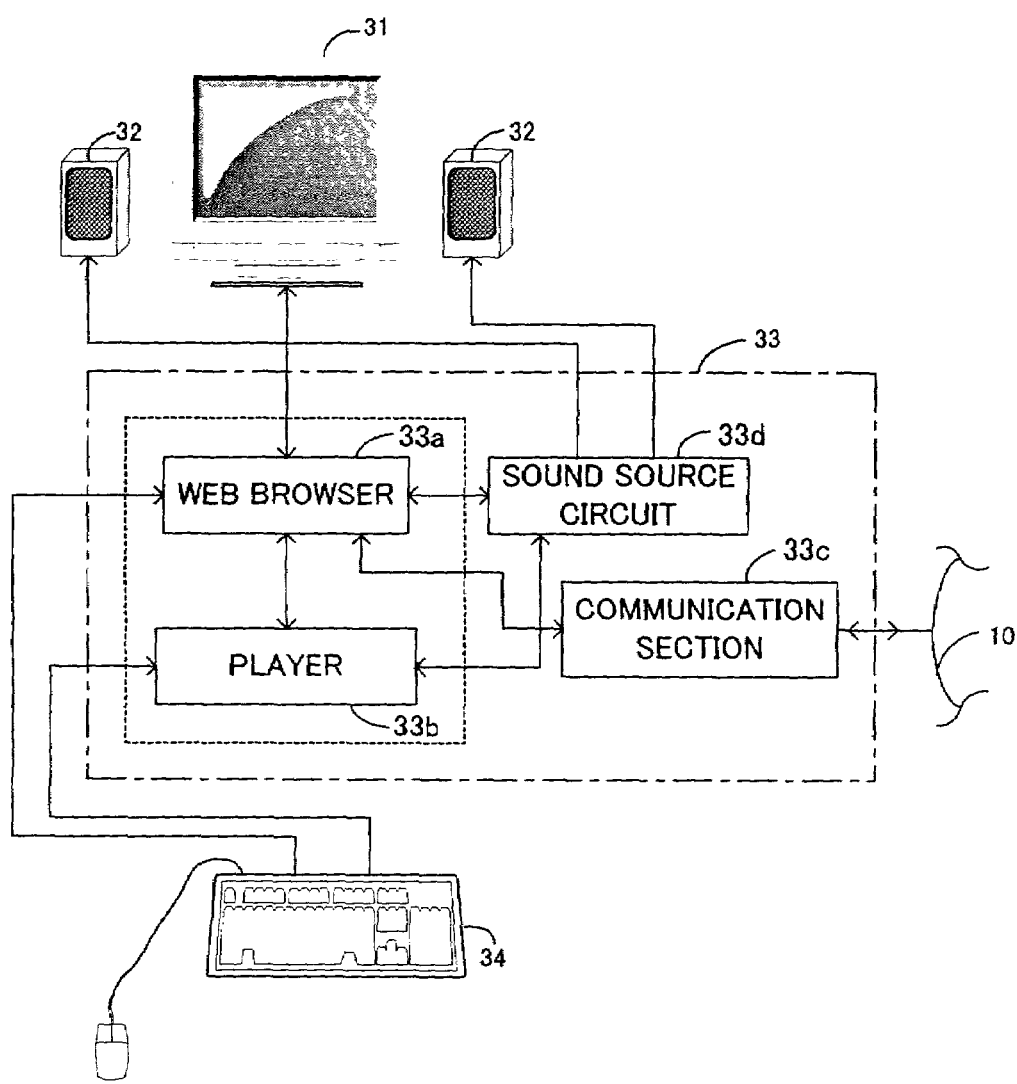
FIG. 2 is a block diagram schematically showing the configuration of a client terminal used in the present invention.

The client terminal 30 is mainly formed of a personal computer (PC). More specifically, as shown in FIG. 2, the client terminal 30 consists of a display unit 31, speakers 32, a control unit 33, and a keyboard 34 equipped with a mouse and serving as an input device. The control unit 33 includes a WEB browser 33a and a player 33b, both realized by means of programs. The control unit 33 further includes a communication unit 33c for controlling communications effected between the Internet 10 and the WEB browser 33a, and a sound source circuit 33d connected to the speakers 32. The WEB browser 33a and the player 33b are connected to the keyboard 34 so as to respond to inputs from the keyboard 34. The WEB browser 33a and the player 33b are connected to each other for mutual data exchange and cooperative operation. That is, the WEB browser 33a and the player 33b control the display unit 31 connected to the WEB browser 33a to thereby provide predetermined display and control the sound source circuit 33d connected to the WEB browser 33a and the player 33b to thereby produce sound from the speakers 32. The sound source circuit 33d includes a sound source, which is not a copy of the sound source provided in the cellular phone 60 but an ordinary GM (General MIDI) sound source or any other suitable sound source. Notably, as will be described later, the player 33b reproduces trial music data (trial content) by use of the sound source circuit 33d and the speakers 32. That is, the player 33b, the sound source circuit 33d, and the speakers 32 constitute trial means for reproducing trial content items.

Referring back to FIG. 1, the relay server 40 includes a computer. Upon reception of data which are supplied from the sound data distribution server 20 and the client terminal 30 via the internet 10, the relay server 40 converts the data to a predetermined signal and transmits the signal to the radio base station 50. The radio base station 50 modulates the signal received from the relay server 40 and transmits the modulated signal to the cellular phone 60. When the radio base station 50 receives a signal transmitted from the cellular phone 60, the radio base station 50 demodulates the signal and supplies a resultant signal to the relay server 40. The relay server 40 converts the signal received from the radio base station 50 to predetermined data and supplies the data to the sound data distribution server 20 and the client terminal 30 in accordance with the above-mentioned predetermined protocol.

Figure 3:
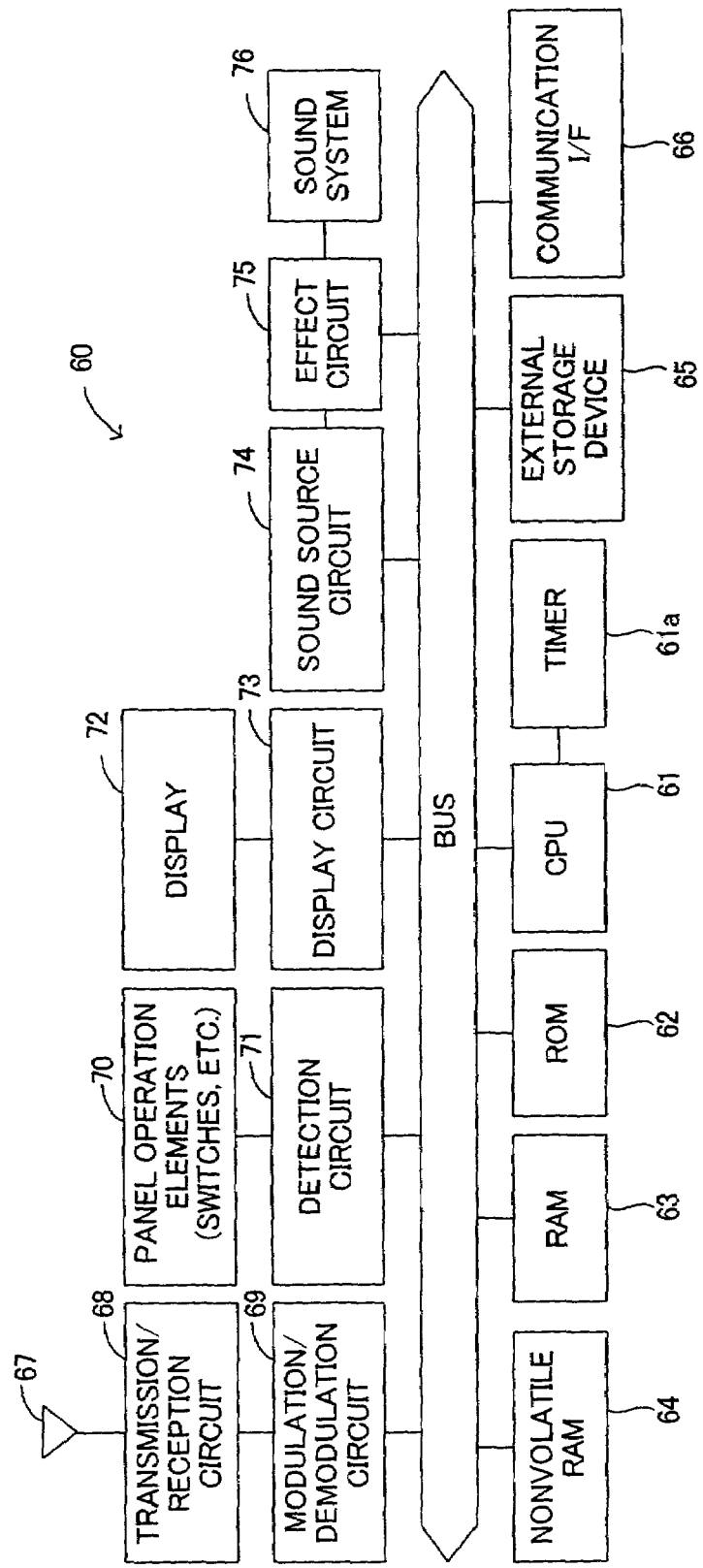
FIG. 3 is a block diagram schematically showing the configuration of a cellular phone used in the present invention.

As shown by the block diagram of FIG. 3, the cellular phone 60 includes a CPU 61, ROM 62, RAM 63, nonvolatile RAM 64, and external storage device 65 such as a memory card, and a communication interface 66 for enabling wired data communication with other computers. These components are mutually connected via a bus and are controlled by the CPU 61. The nonvolatile RAM 64 may be EEPROM.

The cellular phone 60 further includes an antenna 67; a transmission/reception circuit 68 connected to the antenna 67; a modulation/demodulation circuit 69 connected to the transmission/reception circuit 68 and adapted to demodulate a signal received by the antenna 67 and to modulate a signal which is fed by means of control effected by the CPU 61 and which is to be transmitted from the antenna 67; panel operating elements 70 including a plurality of push switches for inputting phone numbers and other instructions; a detection circuit 71 connected to the panel operating elements 70 and adapted to detect actuation of the panel operating elements 70; a display unit 72 for displaying numeric and alphabetic information; a display circuit 73 for controlling display of the display unit 72; a sound source circuit 74; an effect circuit 75 connected to the sound source circuit 74; and a sound system 76 connected to the effect circuit 75 and including an amplifier and a speaker. Of these components, the modulation/demodulation circuit 69, the detection circuit 71, the display circuit 73, the source circuit 74, and the effect circuit 75 are mutually connected via a bus and are controlled by the CPU 61.

Using clock information output from a timer 61a connected to the CPU 61, the CPU 61 executes programs stored in the ROM 62 and the external storage device 65. The RAM 63 serves as storage means for temporarily storing data necessary for execution of the programs by the CPU 61 and received data such as sound data. When data are written in the nonvolatile RAM 64 with an unillustrated main power source being "ON," the nonvolatile RAM 64 stores and maintains the written data even after the main power source in turned "OFF." When the main power source in "ON," the nonvolatile RAM 64 supplies the stored or maintained data to the CPU 61 in accordance with a request from the CPU 61. The nonvolatile RAM 64 constitutes a portion of the registration means for storing (registering) incoming call melodies which the cellular phone 60 produces upon reception of a call. The user can select one of the incoming call melodies as and active incoming call melody through setting operation. Upon reception of call, the CPU 61 reads the selected or active incoming call melody from the nonvolatile RAM 64 and reproduces the incoming call melody by use of the sound source circuit 74, the effect circuit 75 connected to the sound source circuit 74, and the sound system 76 connected to the effect circuit 75 and including an amplifier and a speaker. That is, these components constitute the content execution means of the cellular phone 60.

The charging server 80 includes a computer and is adapted to manage charges to the user. On the basis of data supplied from the sound data distribution server 20 via the Internet 10, the charging server 80 charges a user fee to the user. Specifically, the charging server 80 performs necessary data communication with a computer of a financial institution (bank) at which the user owns his/her account and automatically withdraws from the user's account a usage fee for the sound-data distribution service.

It should be noted that the charging server 80 may charge the fee to the user of the client terminal 30 instead of the user of the portable terminal (the cellular phone 60), if the user of the portable terminal is different from the user of the client terminal 80.

The charging server 80 may be configured to issue an invoice and mail it to the user. The financial institution may be a company which manages a user's credit card. Further, charging may be performed in such a manner that a purchase amount of the sound data is added to telephone charges of the cellular phone 60. The charging scheme may be a per-use rate scheme in which a predetermined amount of money (e.g. 50 yen per piece of music) is charged every time the user purchases a piece of music (corresponding sound data), or a fixed rate scheme in which, upon payment of a predetermined base fee, the user is allowed to purchase a predetermined number of pieces of music within a predetermined period (e.g., up to 10 pieces of music within one month, upon payment of 300 yen), and the number of purchasable pieces of music remaining is decremented each time the user purchases a piece of music. Alternatively, the per-use rate scheme and the fixed rate scheme may be combined to provide a charging scheme in which the predetermined base fee covers purchase of a predetermined number of pieces of music within a predetermined period, and a predetermined fee is added for each piece of music purchased additionally.

Figure 4:
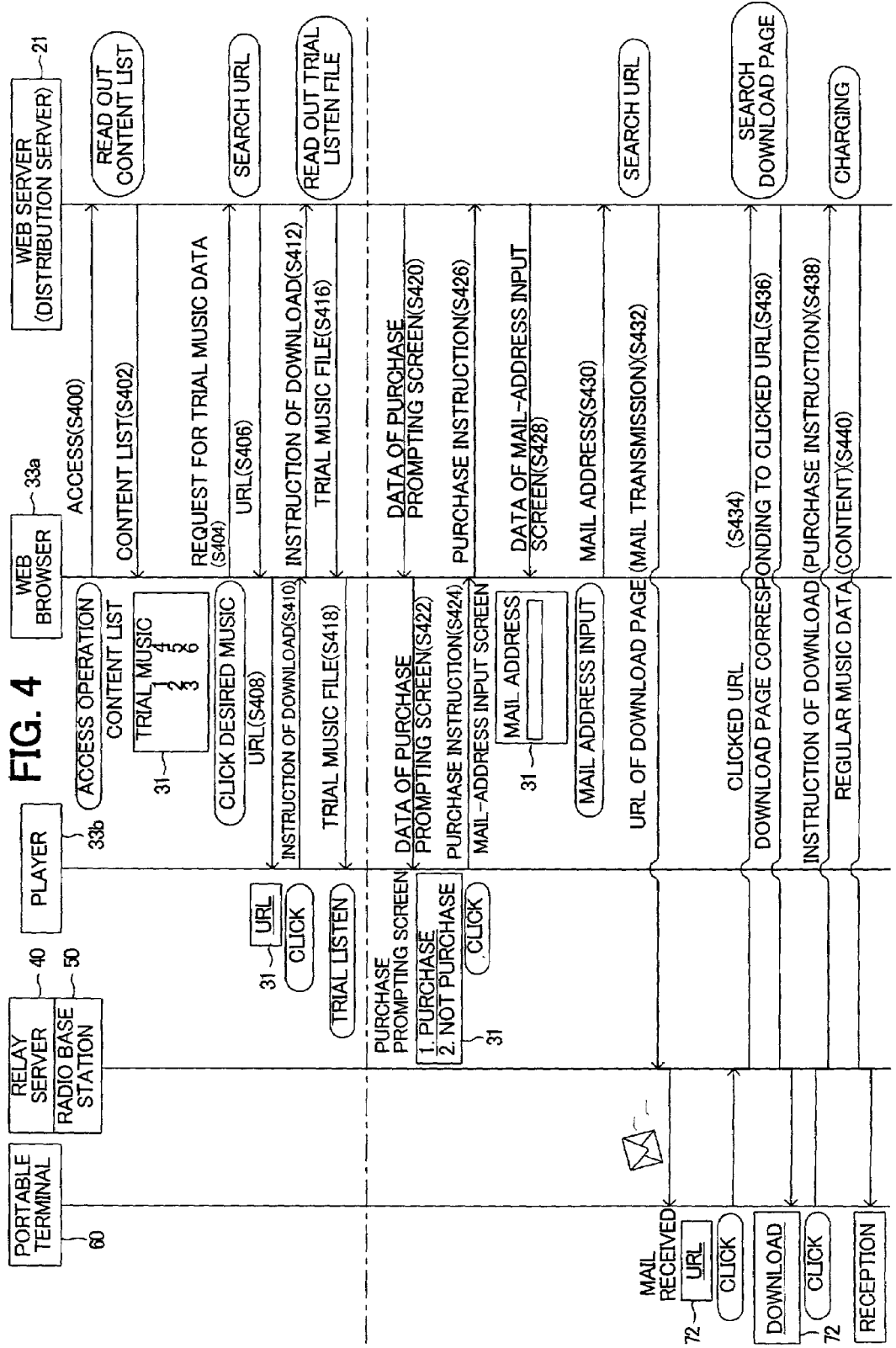
FIG. 4 is a flowchart showing operation of a sound data distribution system according to a first embodiment of the present invention.

Next, operation of the content distribution system having the above-mentioned configuration will be described with reference to FIG. 4. In the following embodiments, the client terminal 30 and the cellular phone 60 are assumed to be owned by the same authorized user.

First, the user starts the WEB browser 33a through operation of the keyboard 34, and access the WEB server 21 of the sound data distribution server 20 by use of the WEB browser 33a (S400). In response to the access operation, the WEB server 21 reads from the data stored in the sound-data database 22 a list of content items (a list of incoming call melodies) which can be distributed to the cellular phone 60, and transmits the list to the WEB browser 33a (S402).

Upon receipt of the content list, the WEB browser 33a displays it on the display unit 31 as a list of pieces of music for trial listening. While viewing the display, the user selects a piece of music that he or she wishes to listen to on a trial basis (a trial piece of music) and specifies the piece through mouse operation. In response to the selection operation, the WEB browser 33a requests the WEB server 21 to distribute data of a trial piece of music (trial music data) specified by the user (S404).

Upon receipt of the distribution request for the trial music data, the WEB server 21 searches a URL (Uniform Resource Locator) of a page (download page) for downloading the requested trial music data, and transmits the searched URL to the WEB browser 33a (S406). The WEB browser 33a supplies the received URL to the player 33b (S408). Upon receipt of the URL, the player 33b display the URL on the display unit 31. When the user wishes to obtain the trial music data, the user clicks the displayed URL by use of the mouse. In response thereto, the player 33b issues a download instruction signal to the WEB browser 33a (S410), and the WEB browser 33s transmits the download instruction signal to the WEB server 21 (S412).

Upon receipt of the download instruction signal, the WEB server 21 reads out of the sound-data database 22 the trial music data specified by the user and transmits the data to the WEB browser 33a as a trial music file (S416). Subsequently, the WEB browser 33a supplies the trial music file to the player 33b (S418). In this case, the WEB server 21 does not charge any fee to the user. The trial music file may be an MIDI file or an audio file. No limitation is imposed on the form of the trial music file, insofar as it is within the range that the player 33b can cope with. For example, it may be a form which can be used in the cellular phone 60 or may be a form which can be obtained through processing of regular music data.

After having confirmed receipt of the trial music file, the user operates the mouse and the keyboard 33 in order to cause the sound source circuit 33d to reproduce the trial music data in the trial music file and produce a sound from the speaker 32 (the user performs a trial).

Simultaneously with the transmission of the trial music file, the WEB server 21 transmits to the WEB browser 33a data of a screen for prompting the user to purchase regular music data which can be used as an incoming call melody on the cellular phone 60 (S420); and the WEB browser 33a supplies the screen data to the player 33b (S422). The player 33b displays the purchase prompting screen on the display unit 31. If the user wishes to purchase regular music data corresponding the piece of music that he/she has listened to on a trial basis, by use of the mouse the user clicks a portion of the screen on the display unit 31 at which "1: PURCHASE" is displayed. If the user does not wish to purchase the regular music data, by use of the mouse the user clicks a portion of the screen at which "2: NOT PURCHASE" is displayed. When the user clicks the portion at which "2: NOT PURCHASE" is displayed, the WEB browser 33a displays the list of trial music data again.

When the user clicks the portion at which "1: PURCHASE" is displayed, the player 33b supplies a purchase instruction signal to the WEB browser 33a (S424), which then transmits the purchase instruction signal to the WEB server 21 (S426). In response to receipt of the purchase instruction signal, the WEB server 21 transmits to the WEB browser 33a data of a screen for inputting a mail address (S428). Upon reception of the data of the mail-address input screen, the WEB browser 33a displays the mail-address input screen on the display unit 31. Specifically, the display unit 31 displays a screen for inputting a mail address of the user's cellular phone 60 to which the regular music data are desired to be distributed.

The user inputs the mail address of the cellular phone 60 by use of the keyboard 34 in accordance with a prompt message displayed on the screen. Upon completion of input, the WEB browser 33a transmits the input mail address to the WEB server 21 (S430).

Upon receipt of the mail address, the WEB server 21 transmits a URL to the cellular phone 60 by an electronic mail directed to the mail address (S432). This URL is of a download page which enables the cellular phone 60 to download regular music data from the WEB server 21. The electronic mail is transmitted from the WEB server 21 to the cellular phone 60 via the relay server 40 and the radio base station 50.

Upon reception of the URL, the cellular phone 60 displays the URL on the display unit 72 of the cellular phone 60. Subsequently, the user clicks the displayed URL by use of the panel operation elements 70. In response thereto, the cellular phone 60 accesses a download page of the WEB server 21 designated by the URL (S434). At this time, the WEB server 21 searches the download page and transmits it to the cellular phone 60 (S436). The cellular phone 60 displays the transmitted download page on the display unit 72.

The user clicks the portion on the display unit 72 at which "DOWNLOAD" is displayed, through operation of the operation elements 70. In response thereto, the cellular phone 60 transmits to the WEB server 21 a download instruction; i.e., and instruction for purchasing regular music data (distribution request) (S438). Upon receipt of the download instruction, the WEB server 21 distributes the regular music data to the cellular phone 60 and performs charge processing for charging a usage fee to the user of the cellular phone 60.

Here, the above-described charge processing will be described further. The WEB server 21 writes in the charge database 23 a distribution fee of the music data, while relating it to the user who has purchased the music data. Subsequently, at a predetermined timing, the WEB server 21 transmits to the charging server 80 data, such as phone number and name, necessary for identifying the user, and data regarding the distribution fee written in the charge data base 23. On the basis of the data, the charging server 80 performs processing necessary for withdrawing the distribution fee from the bank account of the user of the cellular phone 60. Notably, the data, such as phone number and name, for identifying the user are registered in advance in the charging server 80 from the cellular phone 60 or the client terminal 30.

Through the above-described procedure, the cellular phone 60 receives the regular music data from the sound data distribution server 20, and the user registers the data as an incoming call melody of the cellular phone 60 if necessary. More specifically, when the user operates the panel operation elements 70 in a predetermined manner after the received regular music data are stored in the RAM 63, the cellular phone 60 searches and deletes from the nonvolatile RAM 64 music data having the oldest registration date, and stores the received regular music data in an area having been occupied by the deleted data, together with receipt date and time. Thus, the regular music data purchased this time become one of registered music data items which the user of the cellular phone 60 can select as a melody to be produced by the cellular phone 60 upon receipt of a call.

As described above, according to the first embodiment, in response to an operation on the client terminal 30, trial music data are distributed from the sound data distribution server 20 to the client terminal 30; and by use of the trial music data, the user can listen to a regular piece of music on a trial basis at the client terminal 30. Further, in response to an operation on the client terminal 30, the URL of a page for downloading regular music data is transmitted to the cellular phone 60. Subsequently, through a simple click operation on the cellular phone 60 side, the regular music data are downloaded to the cellular phone 60. Accordingly, the user can easily obtain the trial music data and the regular music data and listen to the music on a trial basis. Moreover, since no usage fee is charged to the user at the time of obtainment of the trail music data, the incoming-call-melody distribution service provides a high level of satisfaction to the user.

In the first embodiment, transmission of data of a mail-address input screen (S428), transmission of the URL of a download page (S432), instruction of downloading (S438), and distribution of regular music data (S440) are functions provided by the current distribution means of the sound data distribution server 20. Request for trial music data (S404), transmission of a purchase instruction (S424, S426), and transmission of a mail address (S430) are functions realized by the content request means of the client terminal 30. Further, the request for trial music data (S404) is a function provided by the trial content request means of the client terminal 30; and transmission of the URL of a page for downloading trial music data (S406) and transmission of a trial music file (S416) are functions realized by the trial content distribution means of the sound data distribution server 20.

Second Embodiment

Figure 5:
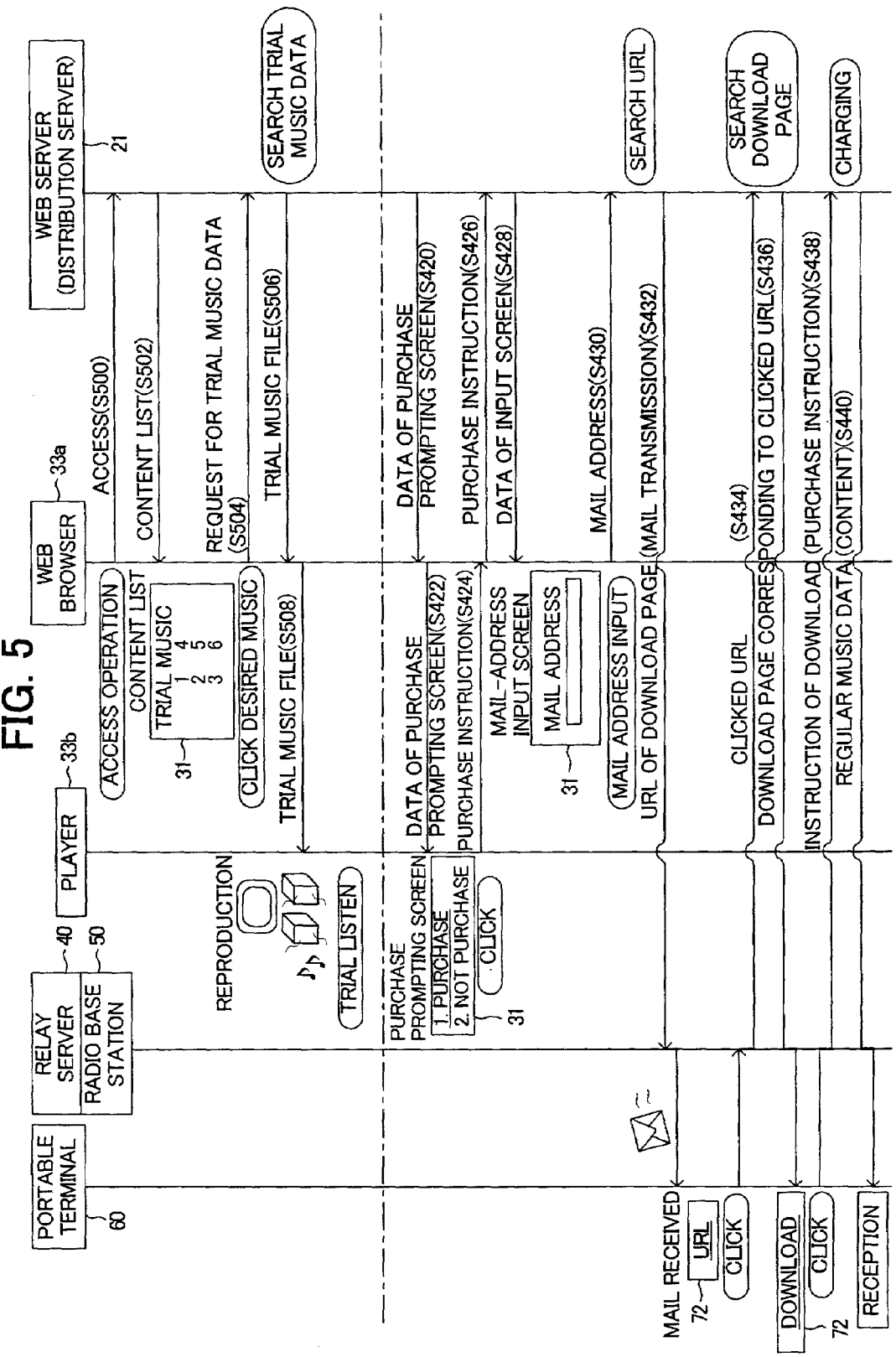
FIG. 5 is a flowchart showing operation of a sound data distribution system according to a second embodiment of the present invention.

Next, a second embodiment of the content distribution system of the present invention will be described. The second embodiment differs from the first embodiment only in the operation up to the point the WEB browser 33a of the client terminal 30 obtains a trial music file. Accordingly, only the difference between the present embodiment and the first embodiment will be described, with reference to FIG. 5.

In the second embodiment as well, the user starts the WEB browser 33a through operation of the keyboard 34, and access the WEB server 21 of the sound data distribution server 20 by use of the WEB browser 33a (S500). In response to the access operation, the WEB server 21 reads from the data stored in the sound-data database 22 a list of content items (a list of incoming call melodies) which can be distributed to the cellular phone 60 and transmits the list to the WEB browser 33a (S502).

Upon receipt of the content list, the WEB browser 33a displays it on the display unit 31 as a list of pieces of music for trial listening. While viewing the display, the user selects a piece of music that he or she wishes to listen to on a trial basis (a trial piece of music) and specifies it through mouse operation. In response to the selection operation, the WEB browser 33a requests the WEB server 21 to distribute data of the trial piece of music (trial music data) specified by the user (S504). The operation up to this point is the same as that in the first embodiment.

Upon receipt of the distribution request for the trial music data, the WEB server 21 searches the requested trial music data and transmits the data to the WEB browser 33a as a trial music file (S506). Subsequently, the WEB browser 33a supplies the trial music file to the player (S508). After having confirmed receipt of the trial music file, the user operates the mouse and the keyboard 33 in order to cause the sound source circuit 33d to reproduce the trial music data and produce a sound from the speaker 32, thereby listening to the music on a trial basis. Through the above-described operation, trial listing is performed on the client terminal 30, and on the basis of the trial listening, the user determines whether to buy the piece of music which the user has listened to on a trial basis. The subsequent operations, including instruction of purchase of regular music data and distribution of the regular music data to the cellular phone 60, are identical with those in the first embodiment.

As described above, the second embodiment enables the user to obtain trial music data to be used on the client terminal 30 by performing a simple operation on the client terminal 30.

Third Embodiment

Figure 6:
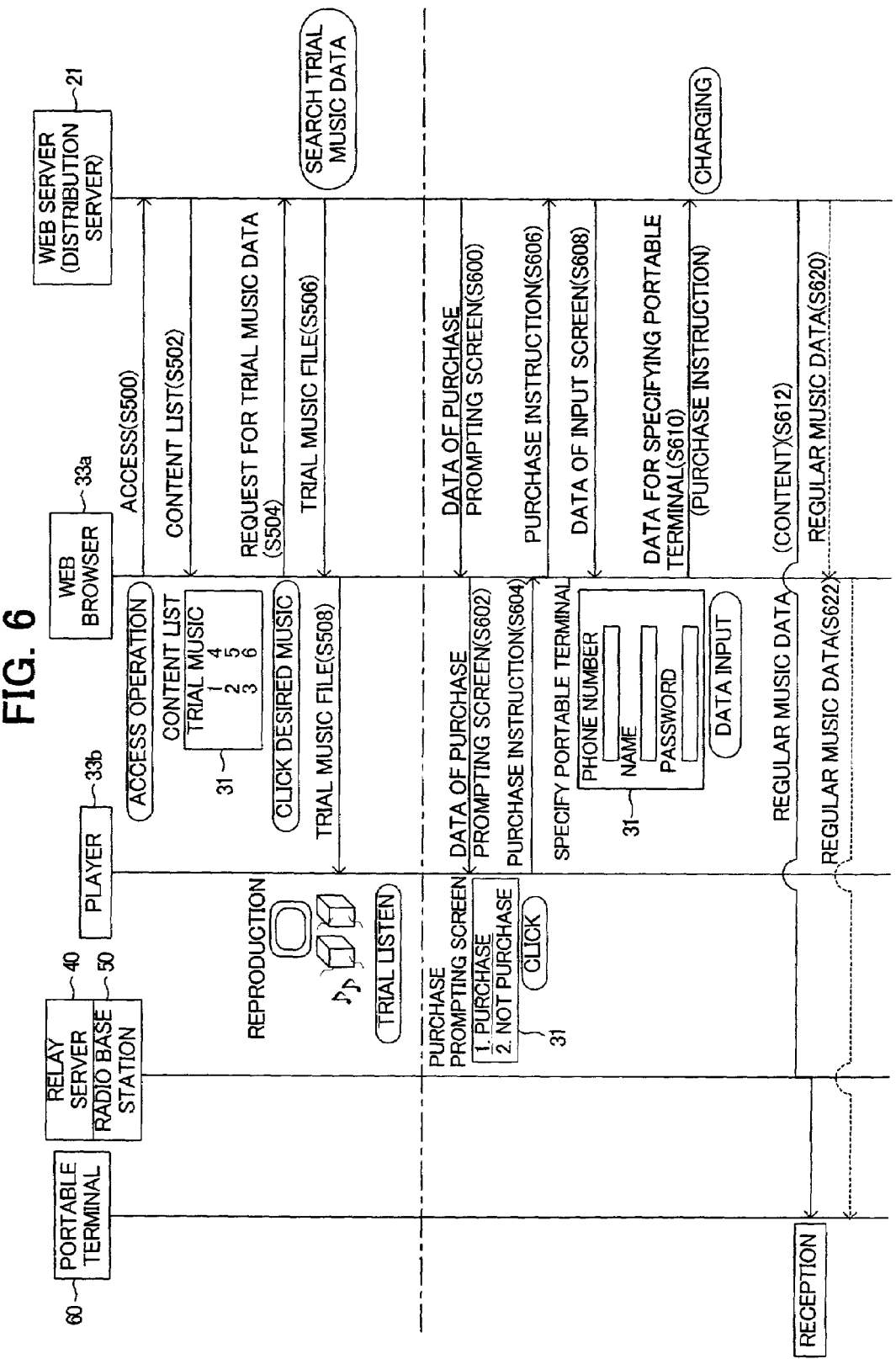
FIG. 6 is a flowchart showing operation of a sound data distribution system according to a third embodiment of the present invention.

Next, a third embodiment of the content distribution system of the present invention will be described. The third embodiment is identical in operation with the second embodiment up to the point at which trial music data are distributed to the client terminal 30. The operation from transmission of a purchase instruction to the sound data distribution server 20 to distribution of regular music data to the cellular phone 60 differs from that in the first and second embodiments. Accordingly, only the operation from purchase instruction to distribution of regular music data will be described with reference to FIG. 6.

Simultaneously with the transmission of the trial music file (506), the WEB server 21 transmits to the WEB browser 33a data of a screen for prompting the user to purchase regular music data which can be used as an incoming call melody of the cellular phone 60 (S600); and the WEB browser 33a supplies the screen data to the player 33b (S602). The player 33b displays the purchase prompting screen on the display unit 31. If the user wishes to purchase regular music data corresponding the piece of music that he/she has listened to on a trial basis, by use of the mouse the user clicks a portion of the screen on the display unit 31 at which "1: PURCHASE" is displayed. If the user does not wish to purchase the regular music data, by use of the mouse the user clicks a portion of the screen at which "2: NOT PURCHASE" is displayed. When the user clicks the portion at which "2: NOT PURCHASE" is displayed, the WEB browser 33a displays the list of trial music data again.

When the user clicks the portion at which "1: PURCHASE" is displayed, the player 33b supplies a purchase instruction signal to the WEB browser 33a (S604), which then transmits the purchase instruction signal to the WEB server 21 (S606). In response to receipt of the purchase instruction signal, the WEB server 21 transmits to the WEB browser 33a data of an input screen for inputting data (portable-terminal specifying data) which specify a cellular phone 60 (S608). Upon reception of the data of the input screen, the WEB browser 33a displays the input screen on the display unit 31. Specifically, the display unit 31 displays an input screen for inputting data which specifies a cellular phone 60 to which the regular music data are desired to be distributed. The data for specifying a cellular phone 60 includes a phone number, a use name, and a password. The reason why input of a password is requested is to confirm whether the cellular phone 60 is used by and authorized user.

The user inputs the data for specifying a cellular phone 60 by use of the keyboard 34 in accordance with a prompt message on the screen. Upon completion of input, the WEB browser 33a transmits the input data to the WEB server 21 (S610). The transmitted data serve as a signal for requesting distribution of the regular music data (a purchase instruction signal).

Upon receipt of the data for specifying the cellular phone 60, the WEB server 21 transmits the regular music data directly to the cellular phone 60 (S612) and performs charge processing for charging a usage fee to the user of the cellular phone 60. Since the charge processing is identical with that in the first embodiment, repeated description thereof is omitted. Through the above-described procedure, the cellular phone 60 receives the regular music data from the sound data distribution server 20, and the user registers the data as an incoming call melody of the cellular phone 60 if necessary.

As described above, in the third embodiment, regular music data are distributed to the cellular phone 60 in response to only the operation at the client terminal 30. Therefore, the user can obtain the regular music data through simple operation.

Modification of Third Embodiment

This modification differs from the above-described embodiment only in the operation performed at the time when regular music data are distributed from the WEB server 21 to the cellular phone 60 ultimately. That is, as indicated by a broken line in FIG. 6, upon receipt of the data for specifying the cellular phone 60, the WEB server 21 transmits the regular music data directly to the client terminal 30 (the WEB browser 33a or the player 33b) (S620). Subsequently, the client terminal 30 transmits the distribution regular music data to the cellular phone 60 (S622). As described above, regular music data may be transmitted to the cellular phone 60 via the client terminal 30. Further, in this case, the regular music data may be transmitted in the form of a document attached to an electronic mail. In this case, instead of the portable-terminal specifying data, the mail address of the client terminal 30 is transmitted to the sound data distribution server 20 in advance.

Fourth Embodiment

Figure 7:
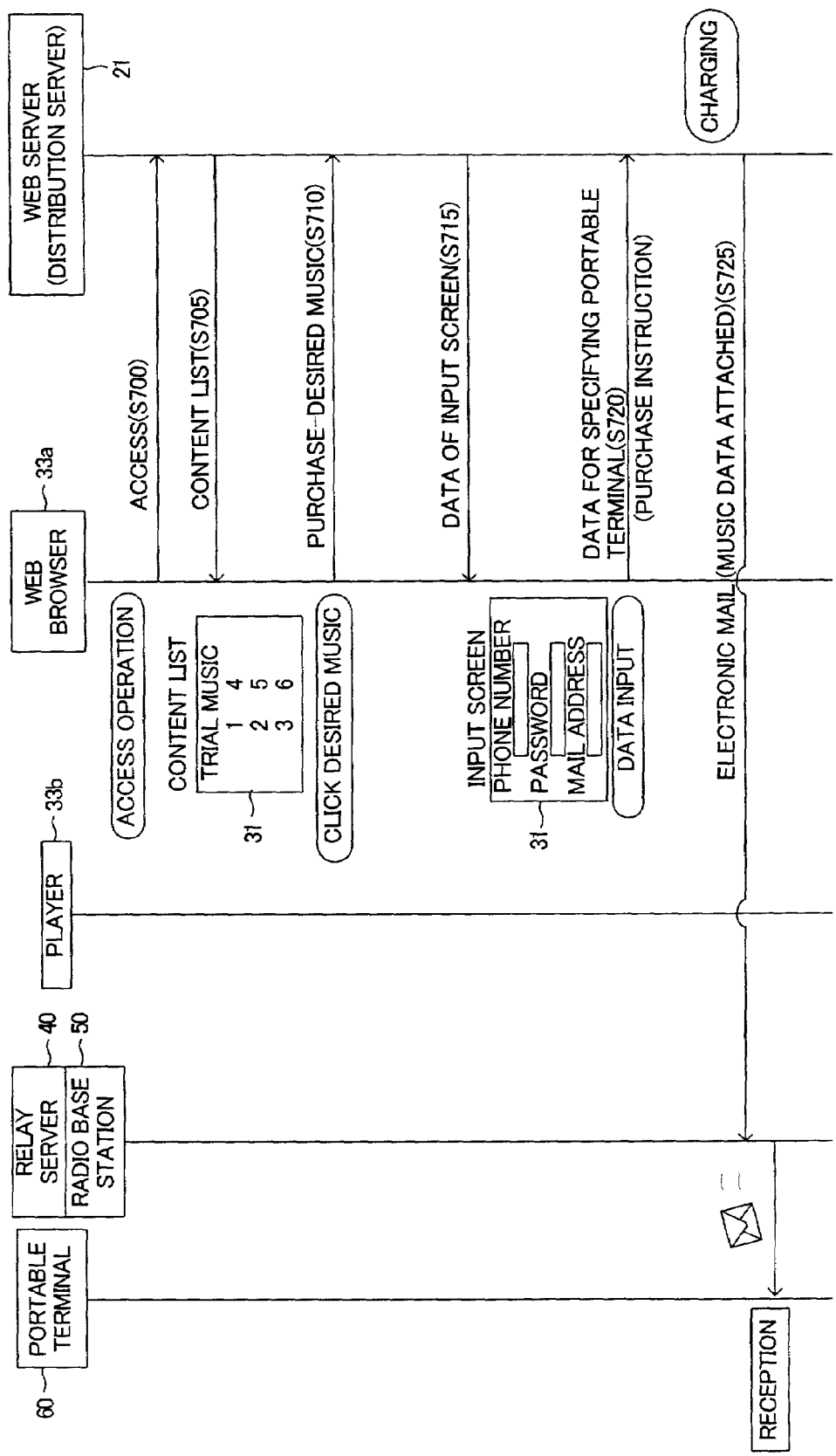
FIG. 7 is a flowchart showing operation of a sound data distribution system according to a fourth embodiment of the present invention.

Next, a fourth embodiment of the content distribution system of the present invention will be described with reference to FIG. 7. The fourth embodiment differs from the first through third embodiments in that trial music data are not distributed to the client terminal 30, and the client terminal 30 merely functions to instruct the sound data distribution server 20 to distribute to the cellular phone 60 music data from the sound data distribution server 20 (the WEB server 21).

That is, the user starts the WEB browser 33a through operation of the keyboard 34, and accesses the WEB server 21 of the sound data distribution server 20 by use of the WEB browser 33a (S700). In response to the access operation, the WEB server 21 reads from the data stored in the sound-data database 22 a list of content items (a list of incoming call melodies) which can be distributed to the cellular phone 60 and transmits the list to the WEB browser 33a (S705).

Upon receipt of the content list, the WEB browser 33a displays it on the display unit 31 as a list of pieces of music for purchase. While viewing the display, the user selects a piece of music that he or she wishes to purchase (a purchase piece of music) and specifies it through mouse operation. In response to the selection operation, the WEB browser 33a transmits to the WEB server 21 data of the title of the piece of music that the user wishes to purchase (S710).

Upon receipt of the transmitted title data, the WEB server 21 transmits to the WEB browse 33a data of an input screen for prompting the user to input from the client terminal 30 data for specifying the mail address of the cellular phone 60 to which regular music data corresponding to the music title are to be distributed (S715). Upon reception of the data of the input screen, the WEB browser 33a displays the input screen on the display unit 31. Specifically, the display unit 31 displays an input screen for inputting data which specify a cellular phone 60 to which the regular music data are desired to be distributed. The data for specifying a cellular phone 60 include a phone number, a user name, a password, and the mail address of the cellular phone 60.

The user inputs the data for specifying the cellular phone 60 by use of the keyboard 34 in accordance with a prompt message displayed on the screen. Upon completion of input, the WEB browser 33a transmits to the WEB server 21 the input data (portable-terminal specifying data including the mail address of the portable terminal) (S720). The transmitted data serve as a signal for requesting distribution of the regular music data (a purchase instruction signal).

Upon receipt of the data for specifying the cellular phone 60, the WEB server 21 transmits an electronic mail to the mail address of the cellular phone 60 (S725). The above-described regular music data (music data corresponding to the music title transmitted from the WEB browser 33a to the sound data distribution server 20) are attached to the electronic mail, so that the regular music data are distributed. Further, at this time, the WEB server 21 performs charge processing for charging a usage fee to the user of the cellular phone 60. Since the charge processing is identical with that in the first embodiment, repeated description thereof is omitted. Through the above-described procedure, the cellular phone 60 receives the music data from the sound data distribution server 20, and the user registers the data as an incoming call melody of the cellular phone 60 if necessary.

As described above, in the fourth embodiment, when data (including a mail address) for specifying the cellular phone 60 to which regular music data are desired to be distributed are input at the client terminal 30, the data for specifying the cellular phone 60 are transmitted from the client terminal 30 to the sound data distribution server 20. Further, in response to the operation at the client terminal 30, regular music data are distributed to the cellular phone 60 as an attachment to an electronic mail directed to the cellular phone 60. Therefore, the user can obtain the regular music data through simple operation.

Fifth Embodiment

Figure 8:
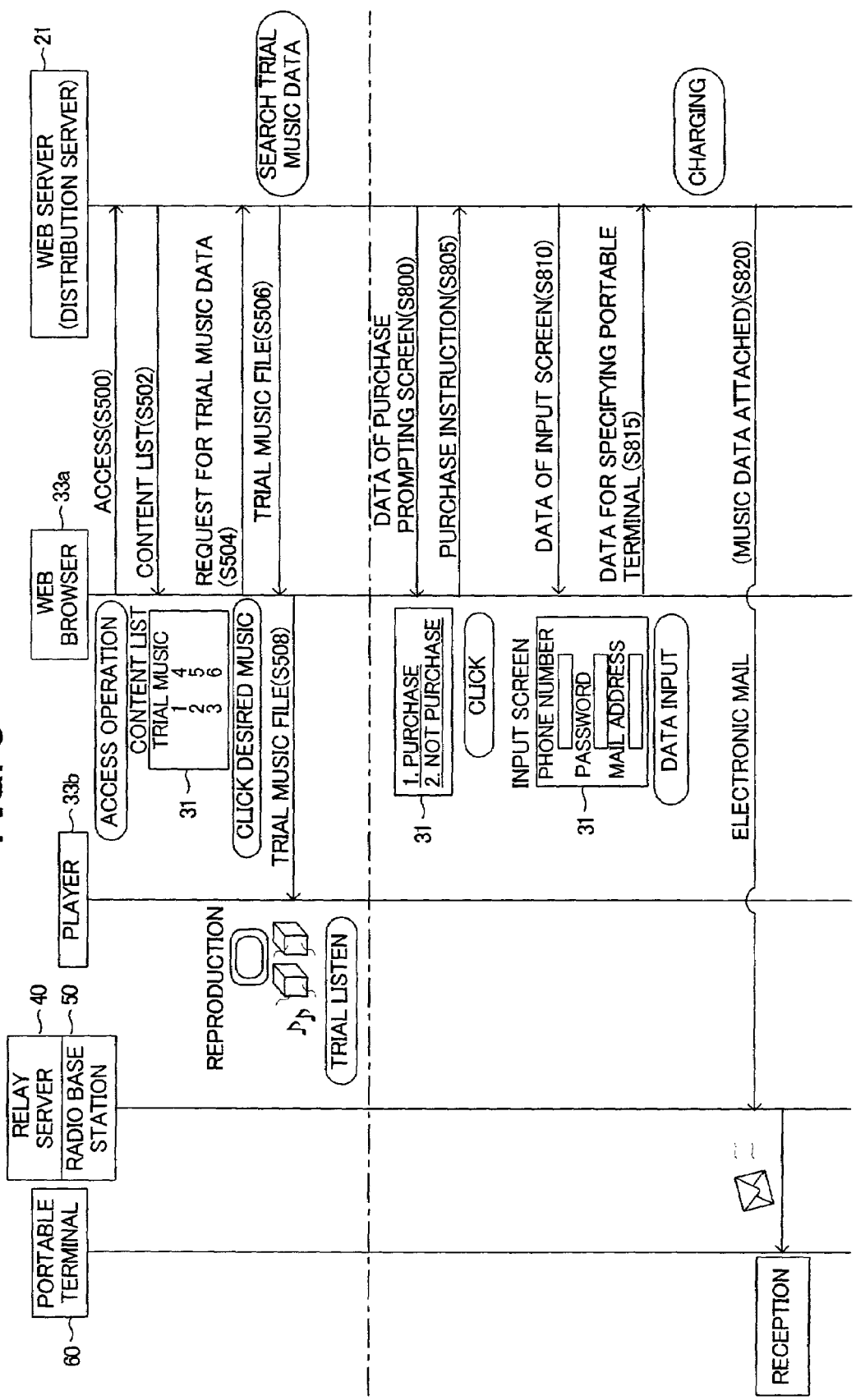
FIG. 8 is a flowchart showing operation of a sound data distribution system according to a fifth embodiment of the present invention.
Figure 9:
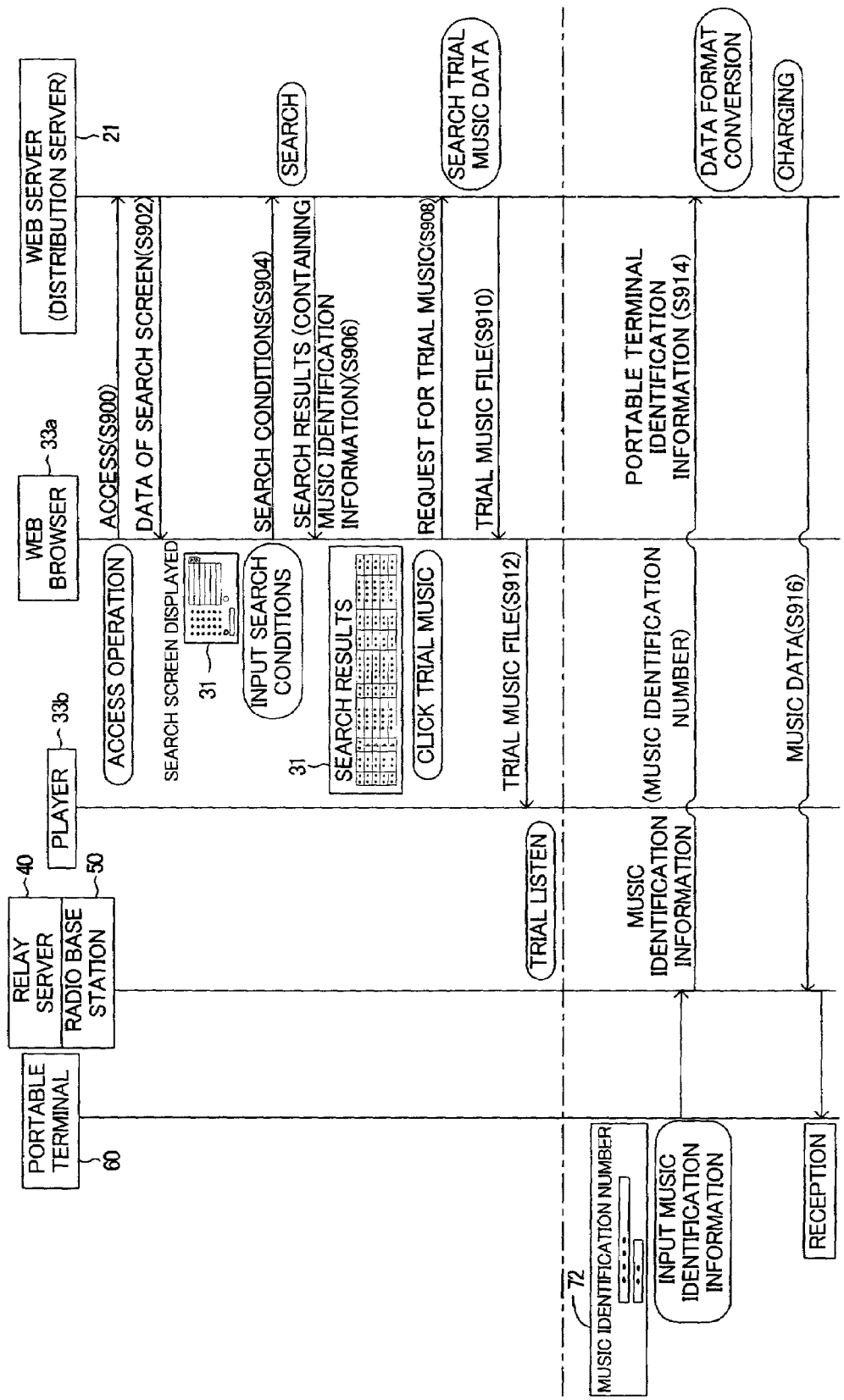
FIG. 9 is a flowchart showing operation of a sound data distribution system according to a sixth embodiment of the present invention.

Next, a fifth embodiment of the content distribution system of the present invention will be described. The fifth embodiment is identical in operation with the second embodiment up to the point at which trial music data are distributed to the client terminal 30. The operation from transmission of a purchase instruction to the sound data distribution server 20 to distribution of regular music data to the cellular phone 60 differs from that in the first and second embodiments. Accordingly, the operation from purchase instruction to distribution of regular music data will be described with reference to FIG. 8.

Simultaneously with the transmission of the trial music file (506), the WEB server 21 transmits to the WEB browser 33a data of a screen for prompting the user to purchase regular music data which can be used as an incoming call melody of the cellular phone 60 (S800); and the WEB browser 33 a displays the received purchase prompting screen on the display unit 31. If the user wishes to purchase regular music data corresponding the piece of music that he/she has listened to on a trial basis, by use of the mouse the user clicks a portion of the screen on the display unit 31 at which "1: PURCHASE" is displayed. If the user does not wish to purchase the regular music data, by use of the mouse the user clicks a portion of the screen at which "2: NOT PURCHASE" is displayed. When the user clicks the portion at which "1: PURCHASE" is displayed, the WEB browser 33*a* transmits a purchase instruction signal to the WEB server 21 (S805).

In response to receipt of the purchase instruction signal, the WEB server 21 transmits to the WEB browser 33*a* data of an input screen for prompting the user to input from the client terminal 30 data for specifying the mail address of the cellular phone 60 to which regular music data are to be distributed (S810). Upon reception of the data of the input screen, the WEB browser 33*a* displays the input screen on the display unit 31. Specifically, the display unit 31 displays an input screen for inputting data which specify a cellular phone 60 to which the regular music data are desired to be distributed. The data for specifying a cellular phone 60 include a phone number, a user name, a password, and the mail address of the cellular phone 60.

The user inputs the data for specifying a cellular phone 60 by use of the keyboard 34 in accordance with a prompt message displayed on the screen. Upon completion of input, the WEB browser 33*a* transmits the input data to the WEB server 21 (S815).

Upon receipt of the data for specifying a cellular phone 60, the WEB server 21 transmits an electronic mail to the mail address of the cellular phone 60 (S820). The above-described regular music data which the user wish to purchase are attached to the electronic mail, so that the regular music data are distributed. Further, at this time, the WEB server 21 performs charge processing for charging a usage fee to the user of the cellular phone 60. Since the charge processing is identical with that in the first embodiment, repeated description thereof is omitted. Through the above-described procedure, the cellular phone 60 receives the music data from the sound data distribution server 20, and the user registers the data as an incoming call melody of the cellular phone 60 if necessary.

As described above, in the fifth embodiment, in response to operation at the client terminal 30, trial music data are transferred from the sound data distribution server 20 to the client terminal 30, thereby enabling the user to listen to the corresponding regular piece of music on a trial basis, by use of the trial music data. Further, in response to operation at the client terminal 30, regular music data are distributed to the cellular phone 60 as an attachment to an electronic mail mailed to the cellular phone 60. Accordingly, the user can easily obtain the trial music data and the regular music data and listen to the music on a trial basis.

Sixth Embodiment

Next, a sixth embodiment of the present invention will be described with reference to FIGS. 9 to 12. The sixth embodiment differs from the first embodiment in that, with specifying search conditions, the user can search a piece or pieces of music which the user wishes to listen to on a trial basis or a piece or pieces of music which the user wishes to be distributed to the cellular phone 60, and in that the user can directly access the WEB server 21 from the cellular phone 60 in order to request distribution of music data to the cellular phone 60.

Specifically, the user starts the WEB browser 33*a* through operation of the keyboard 34, and accesses the WEB server 21 of the sound data distribution server 20 by use of the WEB browser 33*a* (S900). In response to the access operation, the WEB server 21 transmits to the WEB browser 33*a* data of a screen for searching music data (S902). Upon receipt of the data of the search screen, the WEB browser 33*a* displays the data on the display unit 31.

Figure 10:
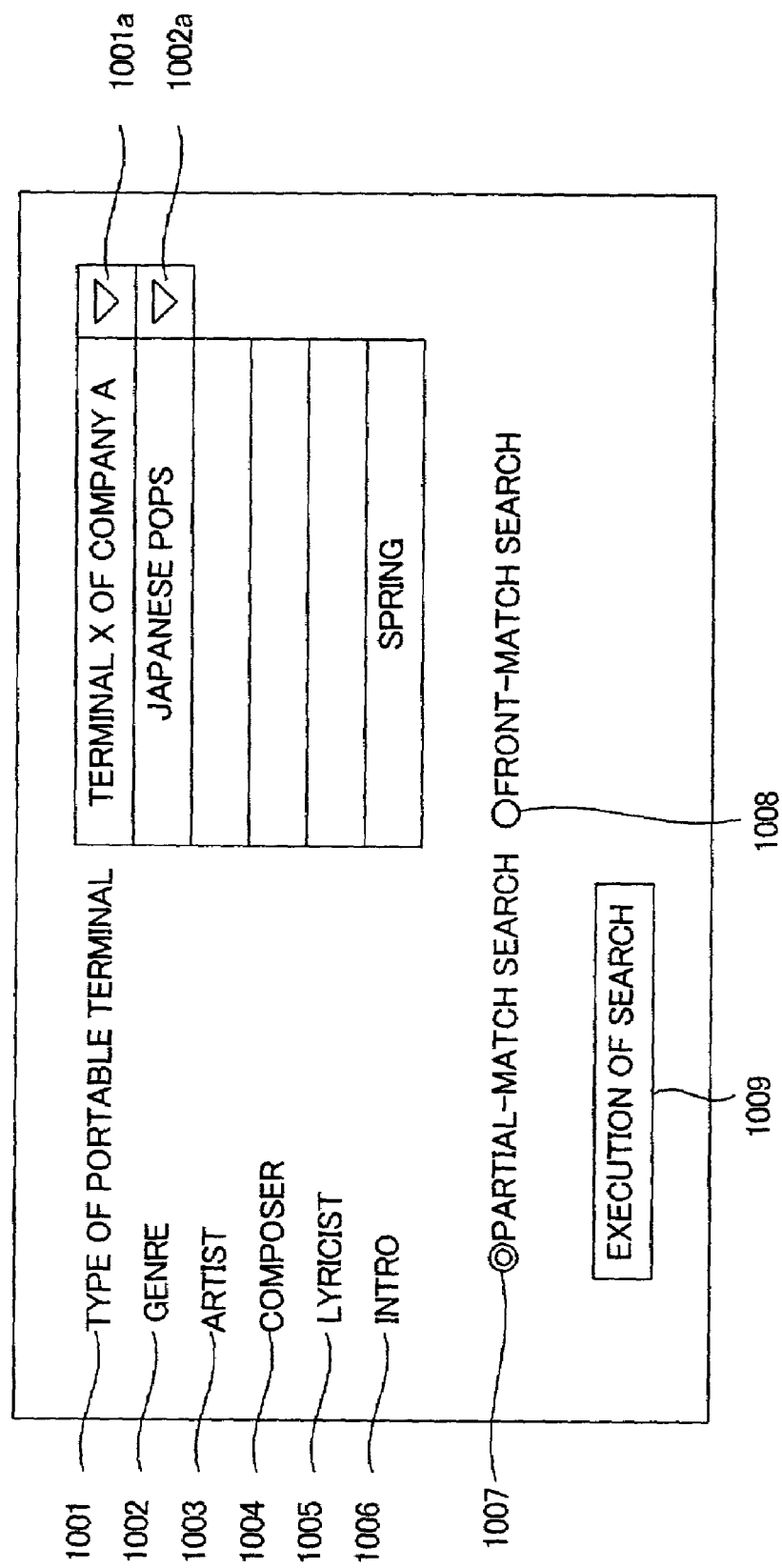
FIG. 10 is an illustration showing a search condition input screen which is displayed on a display unit of a client terminal in the sixth embodiment of the present invention.

As shown in FIG. 10, the search screen is configured to enable the user to input data (search terms) necessary for searching, such as type of portable terminal (cellular phone 60) 1001, genre (of music) 1002, artist 1003; composer 1004, lyricist 1005, and introductory phrase 1006. In addition to the above, the data (search terms) necessary for searching may include keywords (Christmas, summer, morning, love, etc.), era, and relevant information such as information indicating whether the sound data are a reproduction of an advertising jingle or a theme song of a drama. Moreover, when the search screen is displayed, the user can select partial-match search or front-match search by use of radio-type buttons 1007 and 1008. Notably, as to the type of portable terminal, a specific manufacturer name and model name of the cellular phone 60 may be input. However, the type of a sound source scheme (the sound source circuit) of the cellular phone 60 (i.e., "single-tone," "three-tone chord" and "four-tone chord") may be input as a type of portable terminal. The type of portable terminal corresponds to data regarding the environment of the content execution means of the portable terminal.

As a type of portable terminal and genre, corresponding data are input through selective input operation. Specifically, when the user clicks one of buttons 1001*a* or 1002*a* each having an inverted triangle mark and disposed a the right-hand ends of corresponding data input sections, representative items of the corresponding data are displayed. The user can select one item of these by clicking it by use of the mouse. As to other search conditions, text data are input from the keyboard 34.

When the user clicks a search execution button 1009 after inputting data necessary for searching, the WEB browser 33*a* transmits the thus-input search conditions to the WEB server 21 (S904). Notably, the type of portable terminal (the type of the content execution means of the portable terminal), the genre, and the introductory phrase may be selected as essential data for searching, while other conditions may be made optional. In the example in FIG. 10, "Terminal X of Corporation A" is input as a type of portable terminal; "Japanese Pops" is input as a genre; "Spring" is input as an introductory phrase; and "partial-match search" is selected to designate a corresponding search scheme. Notably, in the partial-match search selected by the radio-type button 1007, a condition is judged to be satisfied when the input condition (search term) partially coincides with data subjected to search; and in the front-match search selected by the radio-type button 1008, the condition is judged to be satisfied when the input condition (search term) coincides with the beginning portion of data subjected to search.

Upon receipt of the above-described search conditions, the WEB server 21 searches the sound-data database 22 for music data which satisfy the search conditions. After completion of the search, the WEB server 21 transmits to the WEB browser 33*a* search results or a list of the titles of a plurality of searched pieces of music, data determined uniquely for each piece of music and representing the same, i.e. a music identification number (e.g., a four-digit number) serving as music identification information (i.e., content specifying data for specifying a content item), and the above-described search terms related to each piece of music. Upon receipt of the search results, the WEB browser 33*a* display them on the display unit 31.

A screen for displaying the search results includes a table as shown in FIG. 11. In the table, a serial number 1101, a music identification number 1102, a trial listen request button 1103, a genre 1104, a title 1105, and artist 1106, a composer 1107, a lyricist 1108, an introductory phrase 1109, and a transmission button 1110 are arranged along the horizontal direction in each row. The transmission button 1110 is used to transmit to the cellular phone 60 an electronic mail which contains an URL of a page for downloading regular music data to the cellular phone 60. The search results are displayed in serial number order.

While viewing the search result screen, the user selects a piece of music that he or she wishes to listen to on a trial basis and, by use of the mouse, clicks the trial listen request button 1103 corresponding to the selected piece of music. In response thereto, the WEB browser 33*a* transmits to the WEB server 21 a request signal for requesting distribution of trial music data of a trial piece of music, together with data for specifying the selected trial piece of music; i.e., a corresponding music identification number (S908).

Upon receipt of the request signal for the trial music data, the WEB server 21 reads out of the sound-data database 22 regular music data corresponding to the transmitted music identification number and processes (converts) the regular music data into trial music data having a number of tones, a tone color, and an effect which correspond to the designated type of the cellular phone 60 (the type of the sound source scheme (sound source circuit) or the content execution means of the cellular phone 60; i.e., environment data of the content execution means of the cellular phone 60 serving as a portable terminal).

As described above, the sound source of the sound source circuit 33*d* used in the player 33*b* is not a copy of the sound source of the sound source circuit 74 used in the cellular phone 60, but is an ordinary GM (General MIDI sound module) sound source. Accordingly, the WEB server 21 processes (converts) the trial music data in accordance with the type of the cellular phone 60 and the characteristics of the GM sound source in such a manner that the result (tone color) obtained as a result of reproduction of trial music data by use of the GM sound source approximates the result (tone color) obtained as a result of reproduction of regular music data by use of the sound source circuit 74 of the cellular phone 60. In order to make the result (tone color) obtained from reproduction of trial music data resemble the result (tone color) obtained from reproduction of regular music data by use of the sound source circuit 74 of the cellular phone 60, the tone color of the player 33*b* is preferably set to, for example, a tone color called "clavi."

Subsequently, the WEB server 21 transmits to the WEB browser 33*a* the trial music data produced through the above-described process, as a trial music file (S910); and the WEB browser 33*a*supplies the trial music file to the player (S912). After having confirmed receipt of the trial music file, the user operates the mouse and the keyboard 33 in order to cause the sound source circuit 33*d* to reproduce the trial music data in the trial music file and produce a sound from the speaker 32, thereby performing trial listening. On the basis of the trial listening, the user determines whether to buy the piece of music which he or she has listened to on a trial basis. The trial music file may be distributed directly to the player 33*b* from the WEB server 21 without intervention of the WEB browser 33*a*.

Figure 12:
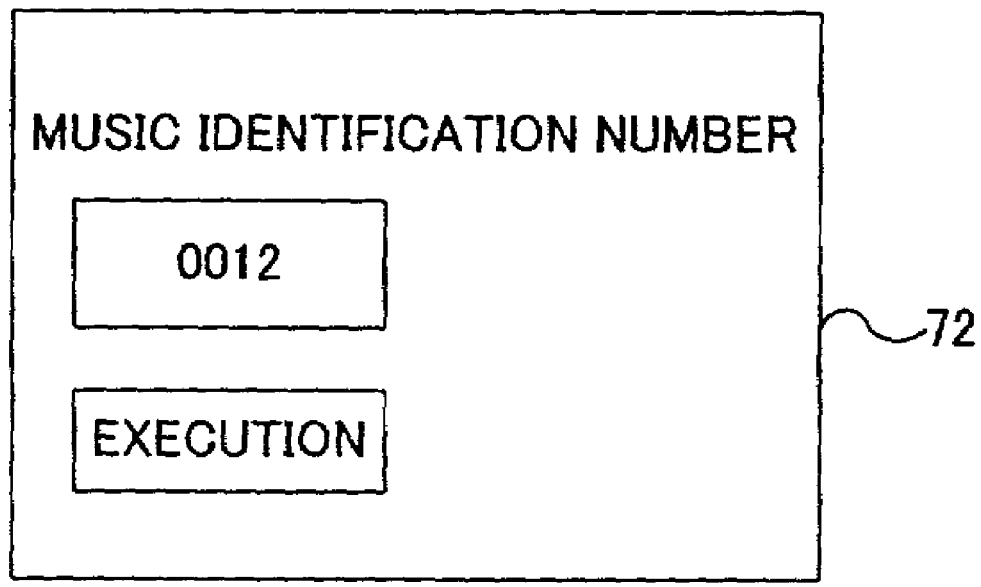
FIG. 12 is an illustration showing a screen for purchasing regular music data which is displayed on a display unit of a cellular phone according to the sixth embodiment of the present invention.

The user may wish to download to the cellular phone 60 regular music data which correspond to a piece of music displayed on the display unit 31 as a search result, when the search result is distributed to the WEB browser 33*a* (S906), or when the user performs trial listening after transmission of a trial music file (S912). In such a case, the user accesses a download page of the WEB server 21 from the cellular phone 60. As a result, the information shown in FIG. 12 is displayed on the display unit 72 of the cellular phone 60.

While referring to the search results displayed on the display unit 31, the user inputs a music identification number allotted to the piece of music which he or she wishes to buy, through operation of the operation elements 70 of the cellular phone 60, and then clicks the execution button.

In response thereto, the cellular phone 60 transmits data containing the music identification number and the cellular-phone identification information (portable-terminal identification information) to the WEB server 21 via the radio base station 50 and the relay server 40 (S914). The cellular-phone identification information contains carrier information indicating a communication service company or the type of the cellular phone 60 (the type of a portable terminal). The cellular-phone identification information serves as data for specifying the type of the content execution means of the cellular phone 60 serving as a portable terminal (environment data of the content execution means of the cellular phone 60 serving as a portable terminal). When the cellular phone 60 transmits the music identification number, the cellular-phone identification information is automatically transmitted together with the music identification number.

Upon receipt of the data containing the music identification number and the cellular-phone identification information, the WEB server 21 reads out of the sound-data database 22 regular music data corresponding to the received music identification number and converts the regular music data to a data format usable on the cellular phone 60, on the basis of the cellular-phone identification information (i.e. the WEB server 21 performs data processing). The data format usable on the cellular phone 60 refers to a format adapted to the number of simultaneously generated sounds, a tone color creation scheme, an effect control scheme, and a scheme for describing note data and time data, which are determined depending on the type of the cellular phone 60 (the type of the content execution means of the cellular phone 60). After performance of a process for charging a usage fee to the user, the WEB server 21 transmits (distributes) to the cellular phone 60 the regular music data having undergone the data format conversion (S916). As a result, the cellular phone 60 obtains the regular music data.

In the above-described example, the data format conversion is performed in accordance with the type of the cellular phone 60. The data format conversion may be performed as follows. Regular music data corresponding to each type of the cellular phone 60 are stored in the sound-data database 22 in advance; regular music data corresponding to the music identification number and the cellular-phone identification information received by the WEB server 21 are selected from the sound-data database 22; and the selected regular music data are distributed to the cellular phone 60 (without data format conversion). Further, the WEB server 21 may be configured to perform data format conversion (data processing) such that regular music data are adapted to the portable terminal, in accordance with the type of the portable terminal (environment data), which are transmitted to the WEB server 21 simultaneously with transmission of search conditions from the WEB browser 33*a* to the WEB server 21 (S904).

As described above, in the sixth embodiment, search conditions for searching music data can be input by use of the client terminal 30, which is superior in ease of operation to the cellular phone 60; and results of search performed under the search conditions can be displayed on the display unit 31 of the client terminal 30, which is larger and of better visibility than the display unit 72 of the cellular phone 60. Further, distribution of trial music data can be requested from the client terminal 30. Accordingly, through a simple operation, the user can search for a desired piece of music and obtain trial music data and regular music data corresponding thereto.

Moreover, a piece of music which is desired to be distributed can be specified by a music identification number allotted to the piece of music, whereby the operation at the cellular phone 60 for specifying a piece of music to be distributed from the sound data distribution server 20 can by simplified. Instead of the music identification number, other types of music identification information may be used, provided that such music identification information is determined uniquely for each piece of music. Examples of such music identification information include the title itself, a shortened title, and a character string containing letters. The content distribution system may be modified such that the music identification number is transmitted from the client terminal 30 (the WEB browser 33a) to the sound data distribution server 20. In this case, the cellular phone 60 is configured such that, before obtainment of regular music data, the cellular phone 60 transmits to the sound data distribution server 20 a predetermined distribution request signal containing data showing that the cellular phone 60 is related to the client terminal 30 which has transmitted the music identification number.

In addition, like the first embodiment, the sixth embodiment is configured in such a manner that the URL of a download page for downloading regular music data is transmitted from the WEB server 21 to the cellular phone 60 by use of an electronic mail, thereby enabling the cellular phone 60 to access to the URL, thereby downloading the regular music data. In this case, although the user must transmit the mail address of the cellular phone 60 from the WEB browser 33a to the WEB server 21 in advance, such an operation can be performed easily on the screen shown in FIG. 11.

This operation will be described more specifically. Among the transmission buttons 1110 on the screen shown in FIG. 11, the user clicks a button corresponding to a piece of music for which he or she wishes download of regular music data. In response thereto, the WEB browser 33a displays an input screen (not shown) for inputting the phone number, password, mail address, etc., of the cellular phone 60. When the user clicks the transmission button on the input screen after inputting of these data, the input data are transmitted from the client terminal 30 to the WEB server 21. Upon receipt of the data, the WEB server 21 transmits the URL of the download page for downloading regular music data to the cellular phone 60 by use of an electronic mail directed to the above-described mail address. The cellular phone 60 displays the URL on the display unit 72. Subsequently, the user clicks the URL in order to access the download page to thereby download the regular music data to the cellular phone 60. The content distribution system may be modified in such a manner that upon the transmission button 1110 being clicked, the WEB browser 33a directly requests the WEB server 21 to download regular music data to the cellular phone 60.

Seventh Embodiment

Figure 13:
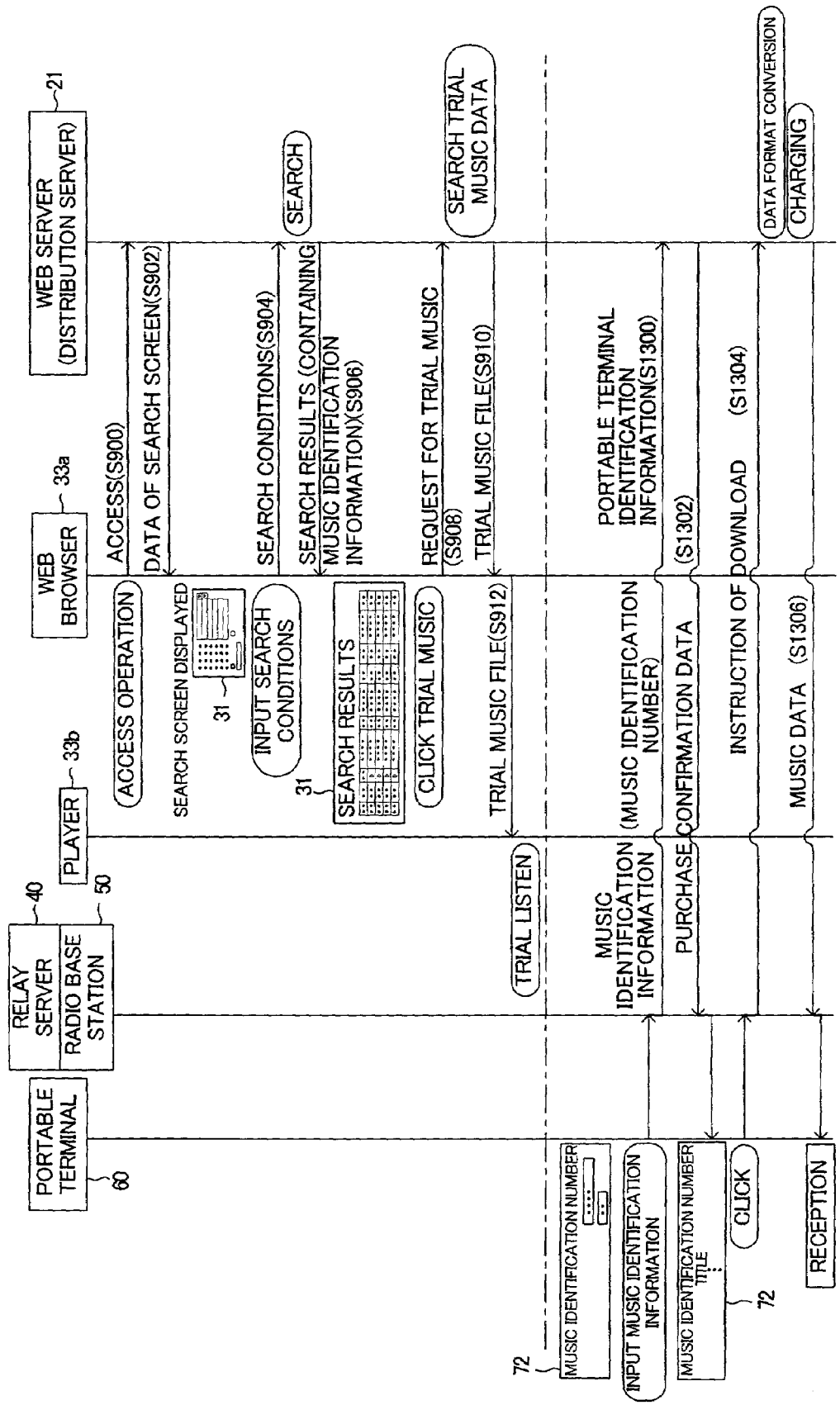
FIG. 13 is a flowchart showing operation of a sound data distribution system according to a seventh embodiment of the present invention.
Figure 14:
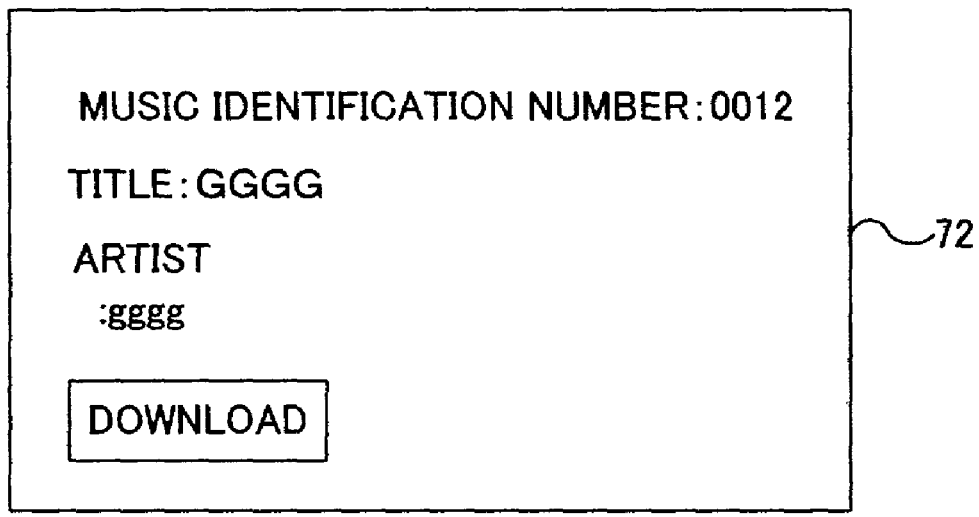
FIG. 14 is an illustration showing a screen for confirming the intention of purchasing regular music data which is displayed on the display unit of the cellular phone according to the seventh embodiment of the present invention.

Next, a seventh embodiment of the present invention will be described with reference to FIGS. 13 and 14. The seventh embodiment differs from the sixth embodiment in that just before the cellular phone 60 obtains regular music data from the WEB server 21, the WEB server 21 requests the user of the cellular phone 60 to confirm obtainment (purchase) of the regular music data.

As described above, the user may wish to download to the cellular phone 60 regular music data which correspond to a piece of music displayed on the display unit 31 as a search result, when the search result is distributed to the WEB browser 33a (S906), or when the user performs trial listening after transmission of a trial music file (S912). In one of these cases, the user accesses a download page of the WEB server 21 from the cellular phone 60. As a result, the information shown in FIG. 12 is displayed on the display unit 72 of the cellular phone 60. While referring to the search results displayed on the display unit 31, the user inputs a music identification number allotted to the piece of music which he or she wishes to buy, through operation of the operation elements 70 of the cellular phone 60, and then clicks the execution button.

In response thereto, the cellular phone 60 transmits data containing the music identification number and the cellular-phone identification information (portable-terminal identification information) to the WEB server 21 via the radio base station 50 and the relay server 40 (S1300). The cellular-phone identification information contains carrier information indicating a communication service company or the type of the cellular phone 60 (the type of a portable terminal). When the cellular phone 60 transmits the music identification number, the cellular-phone identification information is automatically transmitted together with the music identification number. The operation up to this point is identical with that in the sixth embodiment.

Upon receipt of the data containing the music identification number and the cellular-phone identification information, the WEB server 21 transmits purchase confirmation data to the cellular phone 60 in order to confirm the user's intent to purchase (S1302). The cellular phone 60 receives the purchase confirmation data and displays the data on the display unit 72. As shown in FIG. 14, the displayed screen contains the music identification number, title, artist etc., transmitted in the above-described step S1300. While viewing the screen, the user confirms that the piece of music which the user will buy is the intended one. After confirmation, the user clicks a download button displayed on the screen. In response thereto, the cellular phone 60 transmits a download instruction signal to the WEB server 21 (S1304).

Upon receipt of the download instruction signal, the WEB server 21 reads out of the sound-data database 22 regular music data corresponding to the received music identification number and converts the regular music data to a data format usable on the cellular phone 60, on the basis of the cellular-phone identification information. The data format used here is the same as described in the sixth embodiment. After performance of a process for charging a usage fee to the user, the WEB server 21 transmits (distributes) to the cellular phone 60 the regular music data having undergone the data format conversion (S1306). As a result, the cellular phone 60 obtains the regular music data. The operation in Step S1306 constitutes a portion of the function of the content distribution means or the regular content distribution means of the WEB server 21.

As described above, in the seventh embodiment, after transmission of the music identification number from the cellular phone 60 to the sound data distribution server 20, display data for confirming the user's intention are transmitted from the sound data distribution server 20 to the cellular phone 60. As a result, the user can purchase regular music data after confirming that the input music identification number is correct and therefore the desired regular music data can be obtained. Thus, even when the user inputs erroneous data, there does not occur an error such that regular music data which the user does not wish to buy are distributed and a usage fee is charged to the user. Accordingly, an incoming-call-melody distribution service which satisfies users can be provided.

Notably, like the first embodiment, the seventh embodiment may be configured in such a manner that the URL of a download page for downloading regular music data is transmitted from the WEB server 21 to the cellular phone 60 by use of an electronic mail, thereby enabling the cellular phone 60 to access to the URL, thereby downloading the regular music data.

Eighth Embodiment

Figure 15:
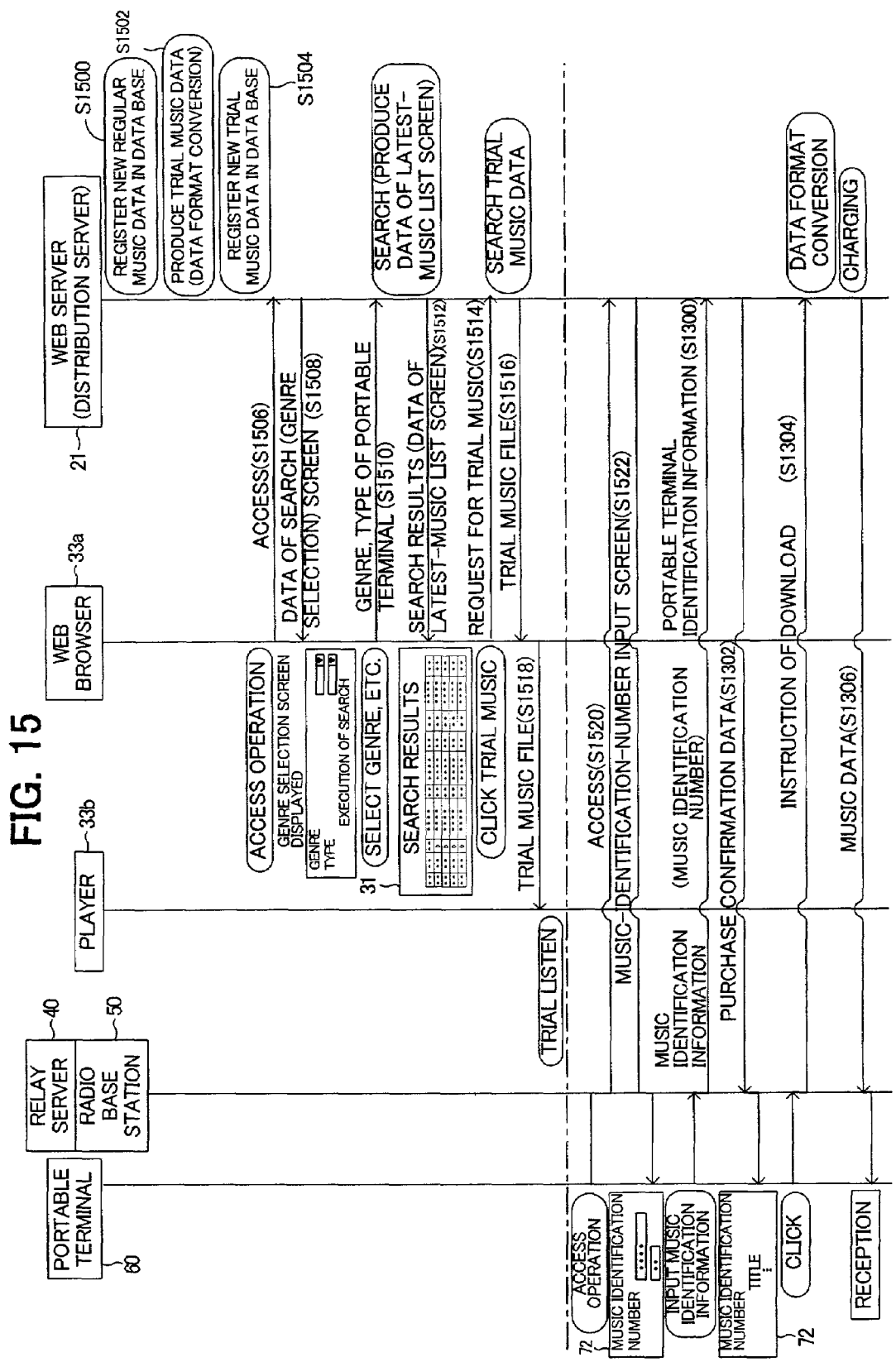
FIG. 15 is a flowchart showing operation of a sound data distribution system according to an eighth embodiment of the present invention.

Next, an eighth embodiment of the present invention will be described with reference to FIGS. 15 to 17. The eighth embodiment differs from the sixth embodiment in that regular music data registered in the database are subjected to data format conversion to thereby produce trial music data and the thus-produced trial music data are registered in the database, that regular music data and trial music data are registered together with data indicating their registration dates, and that searched pieces of music are displayed in the order of registration dates. The remaining portion; i.e., the method for requesting regular music data and distributing the same, is identical with that in the sixth embodiment.

The eighth embodiment will be described specifically. First, regular music data produced by a composer are supplied from a personal computer of the composer to the WEB server 21 via the internet 10. Alternatively, the regular music data are stored in a recording medium such as a floppy disk by the composer; and the recording medium is then mailed to the managing company of the WEB server 21, where the regular music data are stored in the database 22. Regular music data are produced on the assumption that the regular music data are reproduced on the cellular phone 60 which generates three or four tones simultaneously in a simplified MIDI scheme. Accordingly, when the regular music data are data for three-tone simultaneous generation, the regular music data can be used as they are on cellular phones 60 which are adapted for three-tone simultaneous generation. When the regular music data are data for four-tone simultaneous generation, the regular music data can be used as they are on cellular phones 60 which are adapted for four-tone simultaneous generation.

For the above-described regular music data, the composer previously determines keywords in relation to the type of the cellular phone (portable terminal) 60 which can use the regular music data, title, genre, composer, player (artist), etc. As described above, although a specific manufacturer name and model name of the cellular phone 60 may be input as the type of the cellular phone 60, the type of a sound source scheme (the sound source circuit) of the cellular phone 60 (e.g., "three-tone chord" (three-tone simultaneous generation) and "four-tone chord" (four-tone simultaneous generation)) may be input as the type of cellular phone 60. Genre refers to music genres such as Japanese pops, western-style music, classical music, and jazz. The regular music data are registered in the sound-data database 22 together with the above-described keywords and a date (registration date) on which the regular music data are registered (stored) in the sound-data database 22 (S1500 in FIG. 15). This operation corresponds to the function of the content storage means (regular content storage means) of the WEB server 21.

Subsequently, the WEB server 21 converts the data format of the entirety of the registered regular music data to thereby produce trial music data (S1502). The data format conversion is performed in manners described in (1) and (2) below. Notably, the trial music data may be produced from a specific portion (e.g., the first few bars) of the regular music data. The function of converting the regular music data to the trial music data or producing the trial music data corresponds to the function of the content conversion means of the WEB server 21.

(1) The case where registered music data contain music data for three-tone chord (for cellular phones 60 which can generate three tones simultaneously) and music data for four-tone chord (for cellular phones 60 which can generate four tones simultaneously)

In this case, the music data for three-tone chords are processed/converted to an MIDI file by means of software (called "MIDI convert") for conversion to MIDI data. At this time, the trial music data are processed in accordance with the characteristics of the GM sound source, which is a sound source of the player 33b, in such a manner that the result (tone color) obtained as a result of reproduction of trial music data by use of the GM sound source approximates the result (tone color) obtained as a result of reproduction of regular music data by use of the sound source circuit 74 of the cellular phone 60. For example, the processing is performed such that the tone color of the player 33b becomes "clavi."

Meanwhile, the music data for four-tone chords are converted to an audio file. In this case, in order to make the tone color obtained from reproduction of trial music data by the player 33b resemble the tone color obtained from reproduction of regular music data by the cellular phone 60, regular music data are actually provided to a cellular phone 60 which are adapted for four-tone chords and to thereby cause the cellular phone 60 to produce a sound, which is recorded to create an audio file.

(2) The case where all registered regular music data are music data for four-tone chords In this case, the regular music data for four-tone chords are converted to trial music data for four-tone chords in the above-described manner. Further, the regular music data are processed/converted by the MIDI convert such that data corresponding to a single tone are removed from the regular music data to thereby obtain trial music data for a three-tone chord. When trial music data for three-tone chords are created, the regular music data are preferably converted to music data for three-tone chords. In this case, the thus-obtained regular music data for three-tone chords are registered in the sound-data database 22 again together with a keyword indicating that the converted regular music data are music data for three-tone chord, keywords having been allotted to the regular music data from the beginning, and a registration date.

Subsequently, the WEB server 21 stores the trial music data in the sound-data database 22 together with a keyword indicating whether the trial music data are adapted for three-tone chords of four-tone chords, as well as keywords, such as those specifying genre, assigned to the original regular music data from which the trial music data was produced. Further, the registration date of the trial music data are stored, while being related to the trial music data (S1504). This registration corresponds to the function of the content storage means (trial content storage means) of the WEB server 21.

When the trial music data were registered in the sound-data database 22 on a date different from the registration date of the regular music data, the date on which the trial music data were actually registered is registered as the registration date of the trial music data. For example, in the case where data format conversion is manually performed in order to obtain the trial music data, a certain period of time is needed to complete the conversion work. In such a case, the registration date of the trial music data may differ from the registration date of the regular music data. However, the above is a mere example, and the registration date of the trial music data may be changed to coincide with the registration date of the regular music data. Alternatively, re-registration may be performed such that the registration date of the regular music data is changed to coincide with the registration date of the trial music data.

Under the music data distribution system, the user starts the WEB browser 33a through operation of the keyboard 34, and accesses the WEB server 21 of the sound data distribution server 20 by use of the WEB browser 33a (S1506). In response to the access operation, the WEB server 21 transmits to the WEB browser 33a data of a screen for searching music data (genre selection) (S1508). Upon receipt of the data of the search screen, the WEB browser 33a displays the data on the display unit 31.

Figure 16:
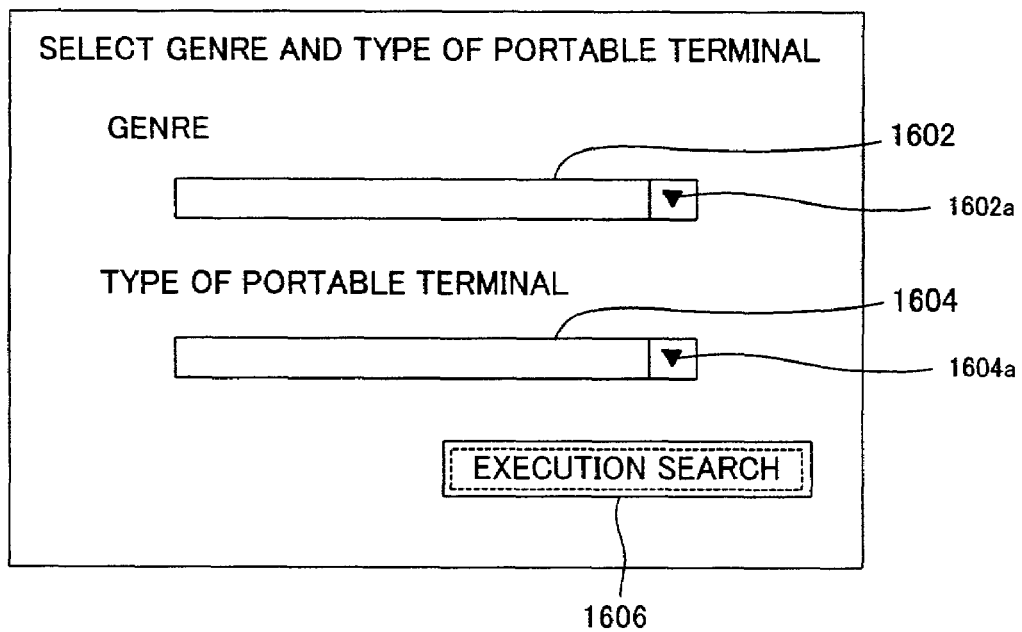
FIG. 16 is an illustration showing a search condition input screen which is displayed on the display unit of the client terminal in the eighth embodiment of the present invention.
Figure 17:
FIG. 17 is an illustration showing a search result display screen which is displayed on the display unit of the client terminal in the eighth embodiment of the present invention.
Figure 18:
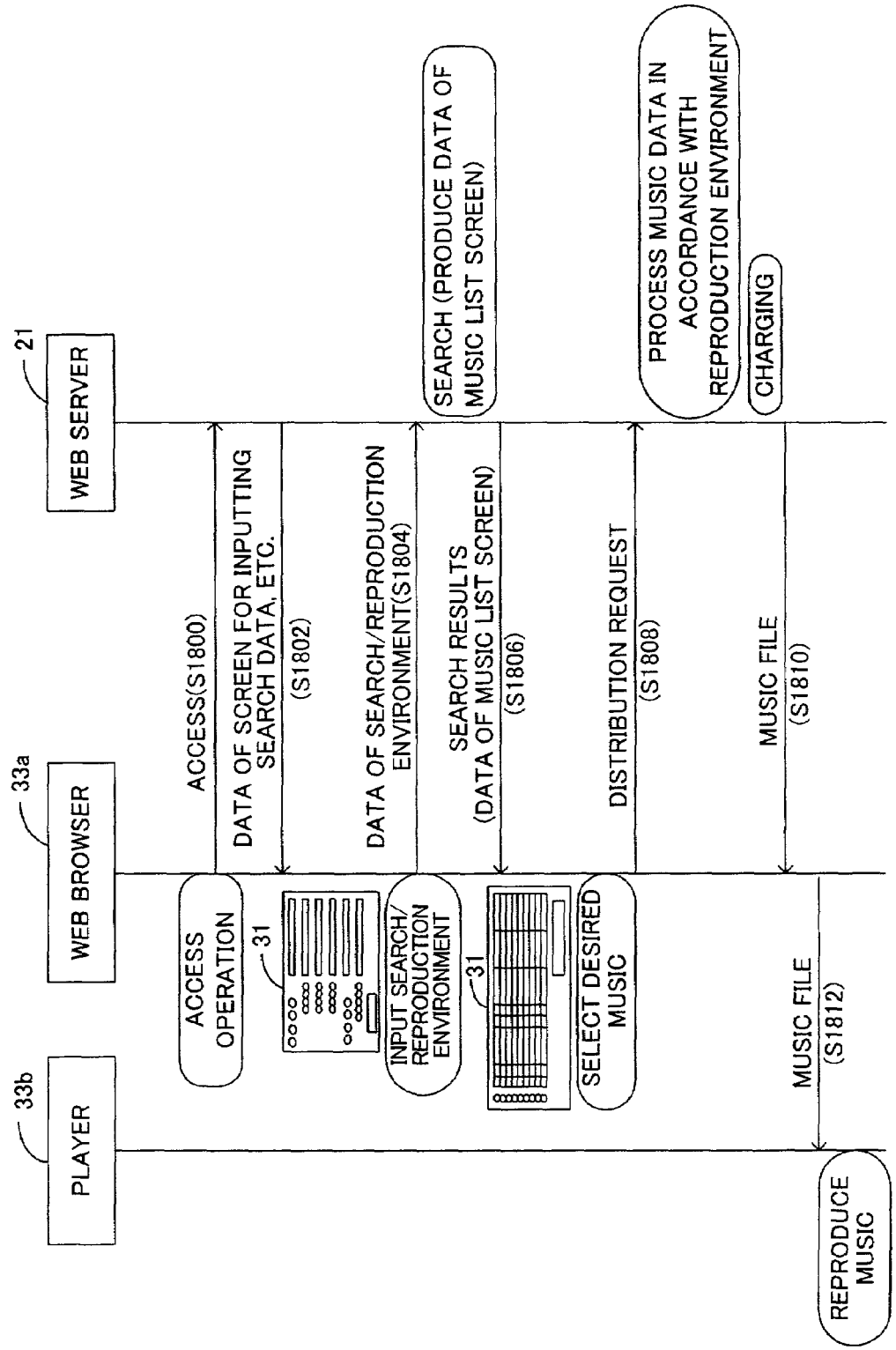
FIG. 18 is a flowchart showing operation of a sound data distribution system according to a ninth embodiment of the present invention.

As shown in FIG. 16, the search screen includes input sections 1602 and 1604 for inputting data (search terms) which specify a genre (of music) and the type of a portable terminal (the cellular phone 60), and a search execution button 1606. The screen is designed to enable the user to input arbitrary data in these input sections 1602 and 1604 through operation of the keyboard 34. Further, buttons 1602a and 1604a each having an inverted triangle mark are disposed at the right-hand ends of the data input sections 1602 and 1604, respectively. When the user clicks one of the buttons 1602a or 1604a, representative items of the corresponding data are displayed. The user can select one item from among these by clicking it by use of the mouse. The displayed items for genre include not only specific genres such as "Japanese pops," "western-style music," and "classical music" but also "genre not specified." The displayed type of the portable terminal may be a specific manufacturer name and model name of the cellular phone 60, or the type of the sound source scheme (sound source circuit) of the cellular phone 60 (e.g., "adapted to three-tone chords" and "adapted to four-tone chords").

When the user clicks a search execution button 1606 after inputting data necessary for searching, the WEB browser 33a transmits to the WEB server 21 the above-described input data in relation to genre and the type of the portable terminal (S1510). This operation corresponds to a portion of the function of the search-condition transmission means of the client terminal 30 and the function of means for transmitting data for specifying the type of the content execution means of the portable terminal.

Upon receipt of the above-described search conditions, the WEB server 21 searches the sound-data database 22 for trial music data which satisfy the search conditions; i.e., both the genre and the type of the portable terminal. When the data regarding the type of the portable terminal represent a manufacturer name and model name of the portable terminal, corresponding trial music data are searched in accordance with the sound source scheme (a sound source adapted for three-tone chords or a sound source adapted for four-tone chords) specified by the data regarding the type of the portable terminal.

After completion of the search, the WEB server 21 sorts or rearranges the search results (music data or data, such as titles, which represent corresponding music data) in descending order of registration dates of trial music data (the latest piece of music appear at the top.), and extracts the n (e.g., 10) data sets which are the newest in terms of registration date. The WEB server 21 converts data representing the extracted trial music data into HTML screen data, together with corresponding music identification numbers and the above-described keywords (title, genre, composer, etc.) allotted to the respective trial music data. The thus-obtained data are transmitted to the WEB browser 33a as search results (S1512). The above-described search and transmission of search results are functions of the search means of the sound data distribution server 20.

After receipt of the search results, the WEB browser 33a displays the search results on the display unit 31. A screen for displaying the search results includes a table as shown in FIG. 17. In the table, a serial number 1701, a registration date of trial music data 1702, a music identification number 1703, a trial listen request button 1704, a genre 1705, a title 1706, an artist 1707, a composer 1708, a lyricist 1709, an introductory phrase 1710, and a transmission button 1711 are arranged along the horizontal direction in each row. The transmission button 1711 is used to transmit to the cellular phone 60 an electronic mail which contains the URL of a page for downloading regular music data to the cellular phone 60. The function of the transmission button 1711 is the same as that of the transmission button 1110 shown in FIG. 11. The system may be configured such that the transmission button 1711 enables the user to directly request the WEB server 21 from the WEB browser 33a to download regular music data to the cellular phone 60. In the above-described table, trial pieces of music are displayed in such a manner that a piece of music having the newest registration date is located at the top, with the remaining pieces of music arranged in descending order of registration dates.

Notably, when the user clicks an arbitrary item (e.g., artist or composer) on the first row of the table by use of the mouse, the displayed search results are rearranged in accordance with the order of the clicked item. Further, the system may be configured to enable the user to designate on the search screen shown in FIG. 16 the number of trial pieces (n pieces) of music which the WEB browser 33a displays as search results. In this case, the WEB server 21 extracts the designated n sets of trial music data from the search results and produces corresponding HTML screen data to be transmitted to the WEB browser 33a such that the designated number (n) of pieces of music are contained in the HTML screen data. Thus, the designated number (n) of pieces of music are displayed on the screen shown in FIG. 17.

When the user cannot find any piece of music he or she wants to listen to on a trial basis, the user clicks a button 1712 displayed in a lower portion of the screen and labeled "DISPLAY NEXT 10." In response thereto, the WEB browser 33a transmits to the WEB server 21 a signal for requesting display of next ten pieces of music. Upon receipt of the request signal, the WEB server 21 removes from the search results the data representing the trial music data having already been transmitted to the WEB browser 33a, and extracts from the remaining trial music data the n sets of trial music data having the latest registration dates. Subsequently, the WEB server 21 rearranges the extracted data in the order of registration dates in the same manner as described above, and transmits the data to the WEB browser 33a in the form of HTML screen data.

After the search results are displayed on the display unit 31 in the above-described manner, while viewing the search result screen, the user selects a piece of music that he or she wishes to listen to on a trial basis, and by use of the mouse clicks the trial listen request button 1704 corresponding to the selected piece of music. In response thereto, the WEB browser 33a transmits to the WEB server 21 a request signal for requesting distribution of trial music data of a trial piece of music, together with data for specifying the selected trial piece of music; i.e., a corresponding music identification number (S1514). This operation corresponds to the function of the trial content request means of the client terminal 30.

When the WEB server 21 receives from the WEB browser 33a the request signal for requesting distribution of the trial music data (S1514), the WEB server 21 reads out of the sound-data database 22 regular music data corresponding to the music identification number contained in the request signal. Subsequently, the WEB server 21 transmits the trial music data to the WEB browser 33a as a trial music file (S1516); and the WEB browser 33a supplies the trial music file to the player 33b (S1518). The transmission of the trial music file to the WEB browser 33a corresponds to the function of the content distribution means or trial content distribution means of the WEB server 21.

After having confirmed receipt of the trial music file, the user operates the mouse and the keyboard 34 in order to cause the sound source circuit 33d to reproduce the trial music data in the trial music file, thereby performing trail listening. On the basis of the trial listening, the user determines whether to buy the piece of music which he or she has listened to on a trial basis. The trial music file may be distributed directly to the player 33b from the WEB server 21 without intervention of the WEB browser 33a. The reproduction of the trial music data corresponds to the function of the content execution means, trial content execution means, or trial means of the client terminal 30.

The remaining operation; i.e., operation for distributing regular music data to the cellular phone 60, is identical with that in the seventh embodiment. This operation will be described briefly. The user may wish to download to the cellular phone 60 regular music data which correspond to a piece of music displayed on the display unit 31 as a search result, when the search result is distributed to the WEB browser 33a (S1512), or when the user performs trial listening after transmission of a trial music file (S1516). In these cases, the user accesses a download page of the WEB server 21 from the cellular phone 60 (e.g., a download page indicted in the screen shown in FIG. 17) (S1520). In response to the access, the WEB server 21 transmits to the cellular phone 60 data for displaying the items shown in FIG. 12 (S1522). Instead of the download page being accessed through input of the URL at the cellular phone 60, access to the download page may be performed in a different manner. That is, when the transmission button 1711 of FIG. 17 is operated, the WEB server 21 transmits the URL of the download page to the cellular phone 60 by use of an electronic mail, whereby the cellular phone 60 displays the URL on the display unit 72. Subsequently, the user clicks the URL in order to access the download page.

As a result, the items shown in FIG. 12 are displayed on the display unit 72 of the cellular phone 60. While referring to the search results displayed on the display unit 31, the user inputs a music identification number allotted to the piece of music which he or she wishes to buy, through operation of the operation elements 70 of the cellular phone 60, and then clicks the execution button. In response thereto, the cellular phone 60 transmits to the WEB server 21 data containing the music identification number and the cellular-phone identification information (portable-terminal identification information) (S1300). The music identification data are data representing a content item; therefore, the transmission of the music identification number corresponds to the function of the data transmission means of the cellular phone 60.

Upon receipt of the music identification number and the cellular-phone identification information, the WEB server 21 transmits purchase confirmation data to the cellular phone 60 in order to confirm the user's intent to purchase (S1302). The cellular phone 60 receives the purchase confirmation data and displays the data on the display unit 72. The thus-displayed screen is identical with that shown in FIG. 14. After the user has confirmed, while viewing the screen, that the piece of music which the user will buy is the intended one, the user clicks a download button displayed on the screen. In response thereto, the cellular phone 60 transmits a download instruction signal to the WEB server 21 (S1304). As a result, after data format conversion which is optionally performed in accordance with the cellular-phone identification information, the corresponding regular music data are distributed to the cellular phone 60 (S1306). The above-described data format conversion may include conversion performed in the case in which regular music data are music data adapted for four-tone chords, from which trial music data for three-tone chords were prepared; and the user requests regular music data adapted for three-tone chords which correspond to the trial music data for three-tone chords but are not stored in the sound-data database 22. In such a case, the regular music data for four-tone chords are converted to regular music data for three-tone chords.

As described above, in the eight embodiment, trial music data are registered in the sound-data databases 22 together with their registration dates, and search results are displayed on the display unit 31 of the WEB browser 33a in descending order of registration. Accordingly, in addition to the effects (advantages) described in relation to the sixth and seventh embodiments, the eighth embodiment achieves the following effects. That is, the user can easily select and obtain newly-arrived pieces of music. Further, even in the case in which trial music data are registered a few days after a composer has uploaded corresponding regular music data to the WEB server 21, the system treats the registration date of the trial music data, not the registration date of the regular music data, as the actual registration date. Therefore, the composer has no cause to complain that the registration date has become old when the trial music data are registered.

Further, since search of trial music data (accordingly, regular music data) is performed by use of genre only, the search of trial music data can be performed quite easily. Moreover, trial music data are produced through conversion from corresponding regular music data in such a manner that the tone color produced by the player 33b as a result of reproduction of the trial music data resembles the tone color obtained as a result of reproduction of the regular music data by use the sound source of the sound source circuit 74 of the cellular phone 60. Therefore, since the tone color obtained as a result of actual reproduction of the regular music data on the cellular phone 60 resembles the tone color obtained as a result of reproduction of the trial music data on the player 33b, the user has no cause to complain about tone color.

Furthermore, in the case in which regular music data to be registered are music data adapted for four-tone chords and are converted to an audio file adapted for four-tone chords, the regular music data are actually reproduced on the cellular phone 60 to produce the regular music, which is then recorded in order to produce the audio file. Therefore, the tone color produced by the player 33b resembles the tone color obtained as a result of reproduction of the regular music data by use the sound source of the sound source circuit 74 of the cellular phone 60. Since the tone color obtained as a result of actual reproduction of the regular music data on the cellular phone 60 resembles the tone color obtained as a result of reproduction of the trial music data on the player 33b, the user has no cause to complain about tone color.

Moreover, when regular music data to be registered are music data adapted for four-tone chords, the regular music data are converted to trial music data adapted for three-tone chords. Therefore, even when the composer supplies regular music data for four-tone chords only, corresponding trial music data which can be used on the cellular phone 60 adapted for three-tone chords can be produced automatically.

Ninth Embodiment

Next, a ninth embodiment of the present invention will be described with reference to FIGS. 18 to 21. The ninth embodiment is directed to a distribution system for music data supplied from the WEB server 21 to the WEB browser 33a (ultimately to the player 33b). The music data may be trial music data or regular music data. The supplied data are not limited to music data but may be other data such as image data or game software data. The hardware configuration of the system according to the ninth embodiment is identical with that of the system according to the first embodiment. Further, as in the case of the eighth embodiment, the music data are registered in the sound-data database 22 together with keywords including registration dates.

First, the user starts the WEB browser 33a through operation of the keyboard 34, and accesses the WEB server 21 of the sound data distribution server 20 by use of the WEB browser 33a (S1800). In response to the access operation, the WEB server 21 transmits to the WEB browser 33a data of an input screen for inputting searching conditions for music data search and reproduction environment data (S1802). Upon receipt of the data of the search and reproduction environment input screen, the WEB browser 33a displays the data on the display unit 31.

Figure 19:
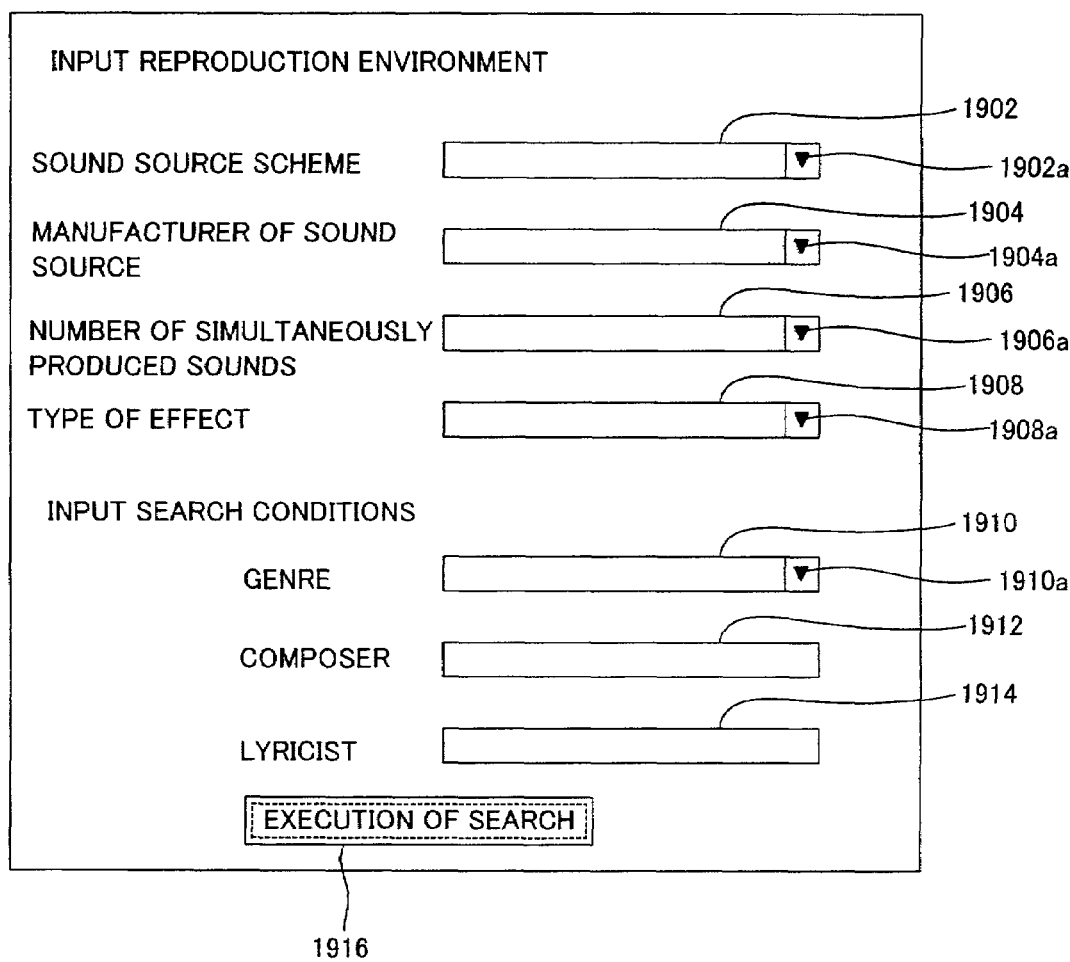
FIG. 19 is an illustration showing a search condition input screen which is displayed on the display unit of the client terminal in the ninth embodiment of the present invention (for the case in which data to be distributed are in the form of MIDI files)

When music data to be distributed are MIDI data, a search and reproduction environment input screen as shown in FIG. 19 is displayed. The search and reproduction environment input screen includes an input section 1902 for inputting a sound source scheme of the player 33b and the sound source circuit 33d, an input section 1904 for inputting a manufacturer of the sound source circuit 33d, an input section 1906 for inputting the number of tones simultaneously produced by the player 33b and the sound source circuit 33d, and an input section 1908 for inputting a type of effect. Further, buttons 1902a, 1904a, 1906a, and 1908a, each having an inverted triangle mark are disposed at the right-hand ends of the data input sections 1902, 1904, 1906, and 1908, respectively. When the user clicks one of the buttons 1902a to 1908a, representative items of the corresponding data are displayed. The user can select one item from among these by clicking it by use of the mouse.

Figure 20:
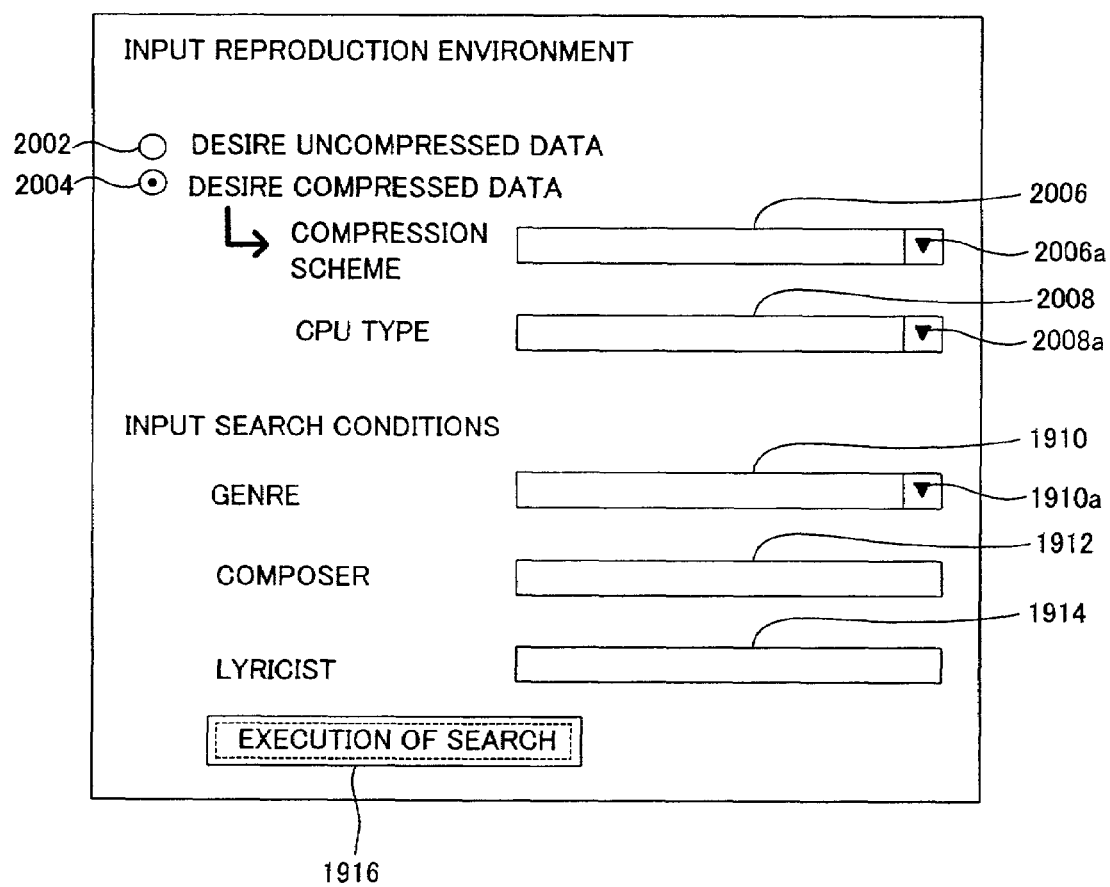
FIG. 20 is an illustration showing a search condition input screen which is displayed on the display unit of the client terminal in the ninth embodiment of the present invention (for the case in which data to be distributed are in the form of audio files)

When music data to be distributed are in the form of an audio data file, a search and reproduction environment input screen as shown in FIG. 20 is displayed. The search and reproduction environment input screen includes selection buttons 2002 and 2004 for selecting whether distribution of uncompressed data or distribution of compressed data is desired, an input section 2006 for inputting a compression scheme when distribution of compressed data is required, and an input section 2008 for inputting a type of a CPU (or the processing performance or power of the CPU) used in the PC (the control section 33) of the client terminal 30. Further, buttons 2006a and 2008a each having an inverted triangle mark are disposed at the right-hand ends of the data input sections 2006 and 2008, respectively. When the user clicks one of the buttons 2006a and 2008a, representative items of the corresponding data are displayed. The user can select one item from among these by clicking it by use of the mouse. The designation of compressed/uncompressed, the compression scheme, and the CPU type are input as data regarding reproduction environment of the client terminal.

Although not illustrated, when music data to be distributed are trial music data corresponding to regular music data for the cellular phone 60, the search screen is configured to enable the user to input the type of the sound source scheme (sound source circuit) of the cellular phone 60, such as "three-tone chord" or "four-tone chord."

Each of the search and reproduction environment input screens shown in FIGS. 19 and 20 includes input sections 1910, 1912, and 1914 for inputting search conditions in relation to genre, composer, lyricist, etc., and a search execution button 1916. Further, a button 1910a having an inverted triangle mark is disposed at the right-hand end of the genre input section 1910. When the user clicks one of the button 1920a, searchable genres are displayed. The user can select one of the displayed genres by clicking it by use of the mouse. The displayed items for genre includes not only specific genres such as "Japanese pops," "western-style music," and "classical music " but also "genre not specified."

When the user clicks the search execution button 1916 after inputting necessary data on the search and reproduction environment input screen, the WEB browser 33a transmits to the WEB server 21 the above-described input data in relation to search conditions and reproduction environment (S1804). This operation corresponds to the function of the environment data transmission means of the client terminal 30.

Upon receipt of the above-described data, the WEB server 21 searches the sound-data database 22 for music data which satisfy (match) the search conditions. After completion of the search, the WEB server 21 rearranges dates of music data, and extracts the n (e.g., 10) data sets which are the newest in terms of registration date. The WEB server 21 converts data representing the extracted music data into HTML screen data, together with corresponding music identification numbers (data representing corresponding content items) and the above-described keywords (specified title, genre, composer, etc.) assigned to the respective music data. The thus-obtained data are transmitted to the WEB browser 33a as search results (S1806).

After receipt of the search results, the WEB browser 33a displays the search results on the display unit 31. A screen for displaying the search results includes a table as shown in FIG. 21. In the table, a serial number 2101, a registration date of music data 2102, a music identification number 2103, a purchase button 2104 for requesting distribution of corresponding music data, a genre 2105, a title 2106, an artist 2107, a composer 2108, a lyricist 2109, and an introductory phrase 2110 are arranged along the horizontal direction in each row. In the table, pieces of music are displayed in such a manner that the piece of music having the newest registration date is located at the top, with the remaining pieces of music arranged in descending order of registration dates. Further, when the user clicks an arbitrary item (e.g., artist or composer) on the first row of the table by use of the mouse, the displayed search results are rearranged in accordance with the order of the clicked item.

When the user cannot find any piece of music he or she wants to purchase (receive distribution), the user clicks a button 2111 displayed in a lower portion of the screen and labeled as "DISPLAY NEXT 10." In response thereto, the WEB browser 33a transmits to the WEB server 21 a signal for requesting display of the next ten pieces of music. Upon receipt of the request signal, the WEB server 21 transmits the next ten pieces of music to the WEB browser 33a in the form of HTML screen data. Thus, the next ten pieces of music are displayed on the display unit 31 of the WEB browser 33a.

After the search results are displayed on the display unit 31 in the above-described manner, while viewing the search result screen, the user selects a piece of music that he or she wishes to purchase (receive distribution of) and by use of the mouse clicks the purchase button 2104 corresponding to the selected piece of music. In response thereto, the WEB browser 33a transmits to the WEB server 21 a distribution request signal including a music identification number which specifies the selected or purchased piece of music (S1808). The transmission of the distribution request signal corresponds to the function of the content distribution request means of the client terminal 30.

When the WEB server 21 receives the music identification number transmitted from the WEB browser 33a, the WEB server 21 reads out of the sound-data database 22 music data corresponding to the music identification number, and processes (converts) the music data such that the music data are adapted to the reproduction environment transmitted at the above-described step S1804. Subsequently, after performance of a process for charging a usage fee to the user, the WEB server 21 transmits the processed music data file to the WEB browser 33a (S1810); and the WEB browser 33a supplies the music data file to the player 33b (S1812). Subsequently, through operation of the mouse and the keyboard 34, the user reproduces the distributed (purchased) music data by means of the sound source circuit 33d. The reproduction of the music data corresponds the function of the content execution means of the client terminal 30.

Examples of the data processing performed by the WEB server 21 for adaptation of music data to reproduction environment will be described below. This data processing corresponds to the function of the content processing means of the WEB server 21.

(1) When music data to be distributed are MIDI data, various parameters such as tone color and sound volume are modified in accordance with the sound source scheme and the manufacturer, among the transmitted data regarding designated reproduction environment (hereinafter maybe referred to as "reproduction environment data). Specific examples includes changing program change data (modifying event data for designating/changing numbers assigned to tone color), modifying bank selection data, modifying sound volume data, and modifying specific parameters, such as file and envelope. Through these modification, differences in the designated sound source scheme and manufacture can be absorbed, and music data stored (registered, memorized) in the database can be reproduced with high fidelity.

(2) When music data to be distributed are MIDI data, the number of tones produced simultaneously is changed in accordance with a simultaneously-produced-tone number designated in the transmitted reproduction environment data; i.e., the number of tones produced simultaneously is reduced when the designated simultaneously-produced-tone number is smaller than the number of tones which are contained in the music data and reproduced simultaneously. Specific examples include partially removing notes from a certain track (part), and removing the track (part) itself. The term "certain track (part)" refers to a relatively unimportant track (part) other than important tracks (parts) such as those for melody and rhythm. Such a relatively unimportant track may be determined for each music data set; or may be determined based on the tone color or sound volume of each track, or the number of tones produced simultaneously. In this case, for example, a track for effect sound, a track having a low sound volume, or a track having a large number of tones produced simultaneously is selected. This operation prevents the overall effect of music from changing greatly, even when the number of tones produced simultaneously must be reduced because a small number of tones produced simultaneously is designated by the transmitted reproduction environment data.

(3) When music data to be distributed are MIDI data, effect parameters are modified in accordance with the designated effect type contained in the transmitted reproduction environment data. Specific examples includes modifying program change data in relation to sound effect, and modifying specific parameters such as the frequency and the amplitude of an LFO (low frequency oscillator), waveform, and time and density of reverberation. Through these modifications, differences in the designated effect type can be absorbed, and music data stored in the database can be reproduced with high fidelity.

(4) When music data are desired to be distributed in the form of a compressed audio file, music data are compressed by use of a compression engine (an encode engine) corresponding to the designated compression scheme contained in the transmitted reproduction environment data to thereby produce an audio file of the desired compression scheme.

(5) When music data to be distributed are in the form of an audio file, music data are compressed at a sampling frequency and bit rate corresponding to the type, processing performance, or power of the CPU in order to produce an audio file.

As described above, in the ninth embodiment, information (data) in relation to reproduction environment of the client terminal 30 for reproducing music data are transmitted to the WEB server 21; and the WEB server 21 processes the music data in accordance with the information in relation to reproduction environment and transmits the thus-processed music data to the WEB browser 33a (i.e., the client terminal 30). As a result, the music data are reproduced at the client terminal 30 with good tone color.

As described above, the respective embodiments of the present invention enable the user to request the sound data distribution server 20 to distribute trial music data and regular music data, by use of the personal computer 30 (client terminal), which is superior in ease of operation to the cellular phone 60 (portable terminal). Therefore, a service which is highly convenient for the user can be provided In the above-described embodiments, no usage fee is charged to the user when trial music data are distributed. Therefore, when on the basis of trial listening the user determines not to buy regular music data corresponding to the trial music data, no usage fee is charged to the user. Therefore, a service which is more satisfactory to the user can be provided.

In above-described embodiments, the sound data distribution server 20 does not charge any fee to the user when distributing trial music data. However, the sound data distribution server 20 may be configured such that when distributing trial music data, the sound data distribution server 20 charges to the user a fee cheaper than that for distribution of regular music data. In this case, the fee for trial music data may be made half the fee for regular music data when the per-use rate scheme is employed; and each piece of music for trial listening may be counted as 0.5 piece of music for regular use when the fixed rate scheme is employed.

In the above-described embodiments, the user must input, for example, a telephone number and a password every time the data specifying the cellular phone 60 to which music data are desired to be distributed are transmitted from the WEB browser 33*a* to the WEB server 21. However, the system may be modified such that the user is requested to input his/her name, a password, etc. only at the time of user registration when the WEB browser 33*a* is first connected to the WEB server 21; and at the time of second and subsequent connections, the WEB browser 33*a* automatically transmits necessary data to the WEB server 21, thereby omitting data input by the user.

In the above-described embodiment, when the cellular phone 60 receives purchased regular music data and detects a predetermined operation of the panel operation elements 70 by the user, the cellular phone 60 deletes from the nonvolatile RAM 64 music data having the oldest registration date and registers the received regular music data in the area having been occupied by the deleted music data. However, the cellular phone 60 may be configured such that the user designates music data to be deleted among the registered music data, and the cellular phone 60 registers the received regular music data in the area having been occupied by the deleted music data.

In the above-described embodiments, the sound source circuit 33*d* of the client terminal 30 is not a copy of the sound source of the cellular phone 60, but is an ordinary GM source. However, the client terminal 30 may use a software or hardware sound source which imitates (or is identical with) the sound source of the cellular phone 60. In this case, the WEB server 21 can transmit trial music data to the WEB browser 33*a* without processing the trial music data.

In the above-described embodiments, regular music data which the cellular phone 60 ultimately obtains are distributed from the WEB server 21 to the cellular phone 60. However, the system may be modified such that regular music data are first transmitted from the WEB server 21 to the client terminal 30 (the WEB browser 33*a* or the player 33*b*), and the client terminal 30 then transmits the regular music data to the cellular phone 60. The transmission may be performed in a wired scheme using a cable or in a wireless scheme using radio waves or infrared rays. The communications between the client terminal 30 and the cellular phone 60 may be performed via a wired or wireless LAN or by any other suitable means.

The Internet 10 used in the above-described embodiments may be replaced with a communication line such as a dedicated line (the communication line is not limited to a wire line but may be a radio link such as a satellite communication channel). The portable terminal is not limited to the cellular phone 60 but may be any of the other devices which include a computer and have a communication function, such as a mobile computer, a PDA (Personal Digital Assistant), or a handheld game machine.

In the above-described embodiment, content items distributed from the sound data distribution server 20 are incoming call melodies. The present invention encompasses distribution of other content items, such as an alarm sound which is produced in the cellular phone 60 under predetermined conditions (e.g., an alarm sound generated at a preset time), BGM used during communication by the cellular phone 60 or used with a reply message produced by the automatic answering function of the cellular phone 60, a music data file attached to an electronic mail mailed to another cellular phone or personal computer, other sound data (music data such as MIDI data), game software for the case in which the portable terminal is a handheld game machine, and images (motion pictures, still pictures) for the case in which the portable terminal is a PDA. When the present invention is applied to these cases, request for distribution of content and trial execution of the content can be performed at the client terminal 30. Therefore, convenience to the user can be improved. When data other than sound data are to be used as content, in place of the player 33*b*, a software program suitable for using the content is provided in the client terminal 30.

Moreover, the above-described embodiments may be combined in order to constitute a sophisticated system. For example, in the first to fifth embodiments, search of music data by the user is not performed. However, the systems of the first to fifth embodiments may be configured such that search similar to that performed in the sixth and seventh embodiments is performed, and search results are displayed on the display unit 71 to thereby enable the user to request distribution of trial music data or regular music data while viewing the search results. Further, the systems of the sixth and seventh embodiments may be configured such that a list of content items is displayed as in the first to fifth embodiments. Moreover, the WEB browser 33*a* and the player 33*b* may be integrated.

In the above-described embodiments, the system is configured such that a single WEB server 21 distributes both regular music data and trial music data. However, the system may be configured such that regular music data and trial music data are distributed from different servers.

Obviously, numerous modifications and variations of the present invention are possible in light of the above teachings. It is therefore to be understood that within the scope of the appended claims, the present invention may be practiced otherwise than as specifically described herein.

What is claimed is:

1. A content distribution system which comprises a portable terminal, a distribution server capable of communicating with said portable terminal, and a client terminal capable of communicating with said distribution server and in which a content item is distributed from said distribution server to said portable terminal by use of said client terminal, wherein said distribution server comprises:

first request receiving means for receiving a first request from said client terminal, the first request being for requesting said distribution server to distribute a trial content item to said client terminal, trial content distribution means for distributing, in response to said first request from said client terminal, said trial content item to said client terminal, second request receiving means for receiving a second request from said client terminal, the second request being for requesting said distribution server to distribute a regular content item, input screen data transmitting means for transmitting an input screen data to said client terminal, said input screen data being for inputting, by use of the client terminal, destination information which specifies said portable terminal to which said regular content item is desired to be distributed, destination information receiving means for receiving said destination information from said client terminal, regular content distribution means for distributing, in response to said second request from said client terminal, a regular content item to said portable terminal which is specified by said destination information, and charging means for charging a fee to a user of said portable terminal which is specified by said destination information, when the regular content item is distributed to said portable terminal which is specified by said destination information;

said client terminal comprises:

trial content request means for transmitting said first request to request said distribution server to distribute said trial content item to said client terminal, trial content item receiving means for receiving said trial content item distributed from said distribution server, reproducing means for reproducing said received trial content item, and regular content request means for transmitting said second request to request said distribution server to distribute said regular content item, input screen data receiving means for receiving said input screen data transmitted from said distribution server, display means for displaying an input screen based on said received input screen data, and destination information transmitting means for transmitting said destination information inputted by use of said input screen; and said portable terminal comprises:

regular content item receiving means for receiving said regular content item distributed from said distribution server, and reproducing means for reproducing said received regular content item.

2. A content distribution system according to claim 1, wherein said regular content distribution means of said distribution server comprises:

URL mailing means for sending an electronic mail to said portable terminal in order to transmit to said portable terminal a URL of a download page for downloading the regular content item; and download means for distributing the regular content item to said portable terminal in response to access to the URL by said portable terminal; and said portable terminal comprises:

content obtaining means for accessing the URL of the download page transmitted from said distribution server in order to download the regular content item.

3. A content distribution system according to claim 1, wherein said destination information is a mail address of said portable terminal to which said regular content item is desired to be distributed.

4. A content distribution system according to claim 3, wherein said regular content distribution means of said distribution server transmits an electronic mail directed to the mail address of said portable terminal, while attaching said regular content item to the electronic mail.

5. A content distribution system according to claim 1, wherein said client terminal comprises type-specifying-data transmission means for transmitting to said distribution server data which specify a type of said reproducing means of said portable terminal; and said regular content distribution means of said distribution server distributes to said portable terminal a regular content item corresponding to the data which specify the type of said reproducing means of said portable terminal.

6. A content distribution system according to claim 5, wherein said distribution server comprises a database which stores a content item; and said regular content distribution means of said distribution server processes the content item stored in said database in accordance with the data which specify the type of said reproducing means of said portable terminal and distributes the processed content item to said portable terminal as the requested regular content item.

7. A content distribution system according to claim 5, wherein said distribution server comprises a database which stores a plurality of content items corresponding to types of said reproducing means of said portable terminal; and said regular content distribution means of said distribution server selects one content item from the plurality of content items stored in said database in accordance with the data which specify the type of said reproducing means of said portable terminal and distributes the selected content item to said portable terminal as the requested regular content item.

8. A content distribution system according to claim 1, wherein a different trial content item is distributed depending on the type of said reproducing means of said portable terminal.

9. A content distribution system according to claim 1, wherein said charging means charges a predetermined fee as said fee to the user of said portable terminal when the regular content item is distributed, and charges a fee lower than the predetermined fee to the user of said portable terminal when the trial content item is distributed.

10. A content distribution method, used by a distribution server for distributing a content item stored in said distribution server to a portable terminal capable of communicating with said distribution server and including reproducing means for reproducing the content item by use of a client terminal capable of communicating with said distribution server, said method comprising the steps of:

receiving a first request from said client terminal, the first request for requesting said distribution server to distribute a trial content item, distributing, in response to said first request from said client terminal, the trial content item to said client terminal, receiving a second request from said client terminal, the second request being for requesting said distribution server to distribute a regular content item, transmitting an input screen data to said client terminal, said input screen data being for inputting, by use of the client terminal, destination information which specifies said portable terminal to which said regular content item is desired to be distributed, receiving said destination information from said client terminal, distributing, in response to said second request from said client terminal, the regular content item to said portable terminal which is specified by said destination information; and charging a fee to a user of said portable terminal which is specified by said destination information, when the regular content item is distributed to said portable terminal which is specified by said destination information.

11. A content distribution method according to claim 10, further comprising a step of:

mailing an electronic mail to said portable terminal, the mail containing a URL of a download page for downloading the regular content item from said distribution server to said portable terminal, thereby allowing said portable terminal to access the URL in order to download the regular content item to said portable terminal.

12. A content distribution method according to claim 10, wherein said destination information is a mail address of said portable terminal to which said regular content item is desired to be distributed.

13. A content distribution method according to claim 12, wherein said regular content item is transmitted from said distribution server as an attachment to an electronic mail which is directed to the mail address of said portable terminal.

14. A content distribution method according to claim 10, further comprising a step of:

receiving, from said client terminal, data which specify a type of said reproducing means of said portable terminal wherein said regular content item which corresponds to the data which specify the type of said reproducing means of said portable terminal is distributed to said portable terminal.

15. A content distribution method according to claim 14, wherein the regular content item corresponding to the data which specify the type of said reproducing means of said portable terminal is produced by said distribution server by processing a content item stored in a database of said distribution server in accordance with the data which specify the type of said reproducing means of said portable terminal.

16. A content distribution method according to claim 14, wherein a plurality of content items corresponding to types of said reproducing means of said portable terminal are stored in a data base of said distribution server; and the regular content item corresponding to the data which specify the type of said reproducing means of said portable terminal is obtained by selecting one content item from the stored content items in accordance with the data which specify the type of said reproducing means of said portable terminal.

17. A distribution server capable of communicating with a portable terminal including reproducing means for reproducing a distributed content item and with a client terminal, comprising:

first request receiving means for receiving a first request from said client terminal, the first request being for requesting said distribution server to distribute a trial content item to said client terminal, first distribution means for distributing, in response to said first request from said client terminal, said trial content item to said client terminal, second request receiving means for receiving a second request from said client terminal, the second request being for requesting said distribution server to distribute a regular content item, input screen data transmitting means for transmitting an input screen data to said client terminal, said input screen data being for inputting, by use of the client terminal, destination information which specifies said portable terminal to which said regular content item is desired to be distributed, destination information receiving means for receiving said destination information from said client terminal, second distribution means for distributing, in response to said second request from said client terminal, the regular content item to said portable terminal which is specified by said destination information; and charging means for charging a fee to a user of said portable terminal which is specified by said destination information, when the regular content item is distributed to said portable terminal which is specified by said destination information.

18. A distribution server according to claim 17, wherein said second distribution means comprises:

URL mailing means for sending an electronic mail to said portable terminal in order to transmit to said portable terminal the URL of a download page for downloading the regular content item; and download means for transmitting the regular content item to said portable terminal in response to access to the URL by said portable terminal.

19. A distribution server according to claim 17, wherein said wherein said destination information is a mail address of said portable terminal to which said regular content item is desired to be distributed.

20. A distribution server according to claim 19, wherein said second distribution means transmits an electronic mail directed to the mail address of said portable terminal, while attaching said regular content item to the electronic mail.

21. A distribution server according to claim 17, wherein in response to a request from said client terminal, said second distribution means distributes to said portable terminal a content item corresponding to the data which specify the type of said reproducing means of said portable terminal, as the regular content item.

22. A distribution server according to claim 21, further comprising a database which stores a content item, wherein said second distribution means processes the content item stored in said database in accordance with the data which specify the type of said reproducing means of said portable terminal and distributes the processed content item as the regular content item to said portable terminal.

23. A distribution server according to claim 21, further comprising a database which stores a plurality of content items corresponding to types of said reproducing means of said portable terminal, wherein said second distribution means selects one content item from the plurality of content items stored in said database in accordance with the data which specify the type of said reproducing means of said portable terminal and distributes the selected content item as the regular content item to said portable terminal.

24. A portable terminal capable of communicating with a distribution server, comprising:

regular content item receiving means for receiving a regular content item distributed from said distribution server, said regular content item being distributed from said distribution server to said portable terminal on the basis of a request from a client terminal for requesting said distribution server to distribute the regular content item, the request being transmitted from said client terminal to said distribution server after said client terminal receives a trial content item distributed from said distribution server, said portable terminal to which the regular content item is distributed from the distribution server being specified by destination information which is transmitted from the client terminal to said distribution server on the basis of input screen data transmitted from the distribution server to the client terminal upon a request to distribute said regular content item; and reproducing means for reproducing said received regular content item.

25. A portable terminal according to claim 24, wherein said regular content item receiving means comprises:

URL receiving means for receiving an electronic mail transmitted from said distribution server and containing a URL of a download page for downloading the regular content item; and content obtaining means for accessing the URL in order to download the regular content item.

26. A portable terminal according to claim 24, wherein said regular content item receiving means receives the regular content item as as an attachment to an electronic mail directed to the mail address of said portable terminal transmitted from said client terminal to said distribution server.

27. A computer-readable recording medium recording a program applied to a client terminal capable of communicating with a distribution server, said program comprising the steps of:

transmitting a first request which is for requesting said distribution server to distribute a trial content item to said client terminal, receiving said trial content item distributed from said distribution server, reproducing said received trial content item, transmitting a second request which is for requesting said distribution server to distribute a regular content item to a portable terminal having content reproducing means, receiving an input screen data transmitted from said distribution server in response to said second request, said input screen data being for inputting, by use of the client terminal, destination information which specifies said portable terminal to which said regular content item is desired to be distributed, displaying an input screen based on said received input screen data, and transmitting said destination information inputted by use of said input screen to said distribution server, wherein said regular content item is distributed from said distribution server to said portable terminal specified by said destination information, and said distribution server charges a fee to a user of said portable terminal specified by said destination information when the regular content item is distributed to said portable terminal specified by said destination information.

28. A computer-readable recording medium according to claim 27, wherein said destination information is a mail address of said portable terminal to which said regular content item is desired to be distributed.

29. A computer-readable recording medium according to claim 27, said program further comprising a step of transmitting to said distribution server data which specify a type of content reproducing means of said portable terminal.

30. A computer-readable recording medium according to claim 28, said program further comprising a step of transmitting to said distribution server data which specify a type of content reproducing means of said portable terminal.

* * * * *